(12) United States Patent
Kitazato et al.

(10) Patent No.: US 10,924,813 B2
(45) Date of Patent: Feb. 16, 2021

(54) RECEPTION APPARATUS, RECEPTION METHOD, TRANSMISSION APPARATUS, TRANSMISSION METHOD, PROGRAM, AND BROADCASTING SYSTEM

(71) Applicant: Saturn Licensing LLC, New York, NY (US)

(72) Inventors: Naohisa Kitazato, Tokyo (JP); Shinobu Hattori, Tokyo (JP); Yoshiharu Dewa, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/246,021

(22) Filed: Aug. 24, 2016

(65) Prior Publication Data

US 2016/0366490 A1  Dec. 15, 2016

Related U.S. Application Data

(63) Continuation of application No. 13/071,551, filed on Mar. 25, 2011.
(Continued)

(51) Int. Cl.
*H04N 21/6543* (2011.01)
*H04N 21/44* (2011.01)
(Continued)

(52) U.S. Cl.
CPC ....... *H04N 21/6543* (2013.01); *H04N 21/435* (2013.01); *H04N 21/4394* (2013.01);
(Continued)

(58) Field of Classification Search
CPC ......... H04N 21/6543; H04N 21/44008; H04N 21/4882; H04N 21/435; H04N 21/43; H04N 21/4394; H04N 21/6332; H04N 21/8133
See application file for complete search history.

(56) References Cited

U.S. PATENT DOCUMENTS 5,563,648 A  10/1996 Menand et al.
6,411,725 B1  6/2002 Rhoads
(Continued)

FOREIGN PATENT DOCUMENTS

CN  1909649 A  2/2007
EP  1 761 047 A2  3/2007
(Continued)

OTHER PUBLICATIONS

Extended European Search Report dated Oct. 1, 2014 in European Application No. 11821584.7.
(Continued)

*Primary Examiner* — Yassin Alata
(74) *Attorney, Agent, or Firm* — Oblon, McClelland, Maier & Neustadt, L.L.P.

(57) ABSTRACT

Disclosed herein is a reception apparatus for receiving transmitted AV (Audio/Video) content, including: an extractor configured to extract trigger information associated with control of an application program to be executed in conjugation with the AV content; and a controller configured, in response to a command indicated by the extracted trigger information, to control execution of the application program and, if a video of the AV content is switched, execute any one of continuation and termination of the application program that is active.

17 Claims, 24 Drawing Sheets

Related U.S. Application Data

(60) Provisional application No. 61/378,225, filed on Aug. 30, 2010.

(51) Int. Cl.
  *H04N 21/488* (2011.01)
  *H04N 21/435* (2011.01)
  *H04N 21/439* (2011.01)
  *H04N 21/6332* (2011.01)
  *H04N 21/81* (2011.01)

(52) U.S. Cl.
  CPC ... *H04N 21/44008* (2013.01); *H04N 21/4882* (2013.01); *H04N 21/6332* (2013.01); *H04N 21/8133* (2013.01)

(56) References Cited

U.S. PATENT DOCUMENTS

| | | |
|---|---|---|
| 7,222,155 B1 | 5/2007 | Gebhardt et al. |
| 7,263,711 B1 | 8/2007 | Estipona |
| 8,595,778 B2 | 11/2013 | Maloney |
| 8,719,886 B2 | 5/2014 | Maloney |
| 9,210,476 B1 * | 12/2015 | Chen ................. H04N 21/4383 |
| 2002/0066111 A1 | 5/2002 | Rodriguez |
| 2003/0208778 A1 | 11/2003 | Aratani et al. |
| 2003/0217369 A1 * | 11/2003 | Heredia ................. H04N 7/162 725/152 |
| 2005/0015803 A1 | 1/2005 | Macrae et al. |
| 2005/0097620 A1 | 5/2005 | Fye |
| 2006/0002551 A1 | 1/2006 | Brown et al. |
| 2007/0022434 A1 * | 1/2007 | Oh ..................... H04N 21/4532 725/32 |
| 2007/0180466 A1 * | 8/2007 | Ando ................. G11B 27/105 725/37 |
| 2007/0245396 A1 | 10/2007 | Kwon et al. |
| 2008/0022329 A1 | 1/2008 | Glad |
| 2008/0189732 A1 * | 8/2008 | Auwens ................. H04N 7/163 725/22 |
| 2008/0263472 A1 | 10/2008 | Thukral et al. |
| 2009/0300200 A1 | 12/2009 | Jochemsen et al. |
| 2010/0122305 A1 * | 5/2010 | Moloney ................. G06F 21/10 725/93 |
| 2010/0154000 A1 | 6/2010 | Macrae et al. |
| 2010/0165201 A1 * | 7/2010 | Yim ................... H04N 5/44591 348/565 |
| 2010/0281498 A1 | 11/2010 | Tanemura et al. |
| 2010/0321586 A1 | 12/2010 | Yang |
| 2011/0004896 A1 | 1/2011 | Srinivasan et al. |
| 2011/0013084 A1 | 1/2011 | Black |
| 2011/0075052 A1 | 3/2011 | Arlng et al. |
| 2011/0255516 A1 | 10/2011 | Pawar et al. |
| 2012/0002111 A1 | 1/2012 | Sandoval et al. |
| 2012/0054784 A1 | 3/2012 | Kitazato et al. |
| 2012/0063508 A1 | 3/2012 | Hattori et al. |
| 2012/0084802 A1 | 4/2012 | Kitazato et al. |
| 2012/0253826 A1 | 10/2012 | Kitazato et al. |

FOREIGN PATENT DOCUMENTS

| | | |
|---|---|---|
| JP | 5-64167 A | 3/1993 |
| JP | 8-51596 | 2/1996 |
| JP | 2003-502920 | 1/2003 |
| JP | 2003-274300 | 9/2003 |
| JP | 2006-50237 | 2/2006 |
| JP | 2008-505519 | 2/2008 |
| JP | 2010-166335 | 7/2010 |
| KR | 10-2007-0012053 | 1/2007 |
| WO | WO 2006/129819 A1 | 12/2006 |

OTHER PUBLICATIONS

International Search Report dated Sep. 13, 2011 in Application No. PCT/JP2011/068836 (with English translation).
European Office Action dated Nov. 24, 2016 in patent application No. 11 821 584.7.
Chinese Office Action dated Apr. 1, 2015 in patent application No. 201180040453.1 with English translation.
Office Action dated Jul. 27, 2017 in Korean Patent Application No. 10-2013-7004216 (With English Translation).

* cited by examiner

TWO-DIMENSIONAL BARCODE
→TRIGGER INFORMATION

FIG. 8

Trigger with "Pre-cache" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "pre-cache" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |

FIG. 9

Trigger with "Execute" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "execute" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |
| App_life_scope | 2 | 0: ES bound       1: service bound<br>2: Provider bound  3: Un-bound |
| App_expire_date | 32 | Passing over it, Application shall be terminated if Terminated Command is not issued. |

FIG.10

Trigger with "Inject_event" command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "inject event" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

FIG.11

Trigger with "Suspend" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "Suspend" command. |
| Trigger_validity | 8 | The reciprocal of this integer value shows probability this trigger shall be treated as valid. |
| App_id | 24 | Application identifier this command target |
| App_type | 4 | Application type (for example HTML5) |

FIG.12

Trigger with "Terminate" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "Terminate" command. |
| Trigger_validity | 8 | The reciprocal of this integer value shows probability this trigger shall be treated as valid. |
| App_id | 13 | Application identifier this command target |
| App_type | 4 | Application type (for example HTML5) |

FIG.13

| Syntax | No. Bits | Format |
|---|---|---|
| Trigger_Info_data() { | | |
|    trigger_id | 8 | uimsbf |
|    protocol_version | 8 | uimsbf |
|    command_code | 8 | uimsbf |
|    trigger_validity | 8 | uimsbf |
|    App_id | 24 | uimsbf |
|    App_type | 4 | uimsbf |
|    App_url | 32 | |
|    if(command_code==1) { | | (pre-cache) |
|       broadcast_App_flag | 1 | uimsbf |
|       downloaded_App_flag | 1 | uimsbf |
|       internet_App_flag | 1 | uimsbf |
|       reserved | 1 | "1" |
|    } | | |
|    if(coomand_code==2) { | | (execute) |
|       broadcast_App_flag | 1 | uimsbf |
|       downloaded_App_flag | 1 | uimsbf |
|       internet_App_flag | 1 | uimsbf |
|       App_life_scope | 2 | uimsbf |
|       App_expire_date | 32 | bslbf |
|    } | | |
|    if(command_code==3) { | | (inject event) |
|       reserved | 4 | "1111" |
|       event_id | 16 | uimsbf |
|       event_embedded_data_length | 8 | uimsbf |
|       for(i=0; i<N; i++) { | | |
|          event_embedded_data_byte | 8×N | bslbsf |
|       } | | |
|    } | | |
|    if(coomand_code==4 || coomand_code==5) { | | (suspend/ terminate) |
|       reserved | 4 | "1111" |
|    } | | |
| } | | |

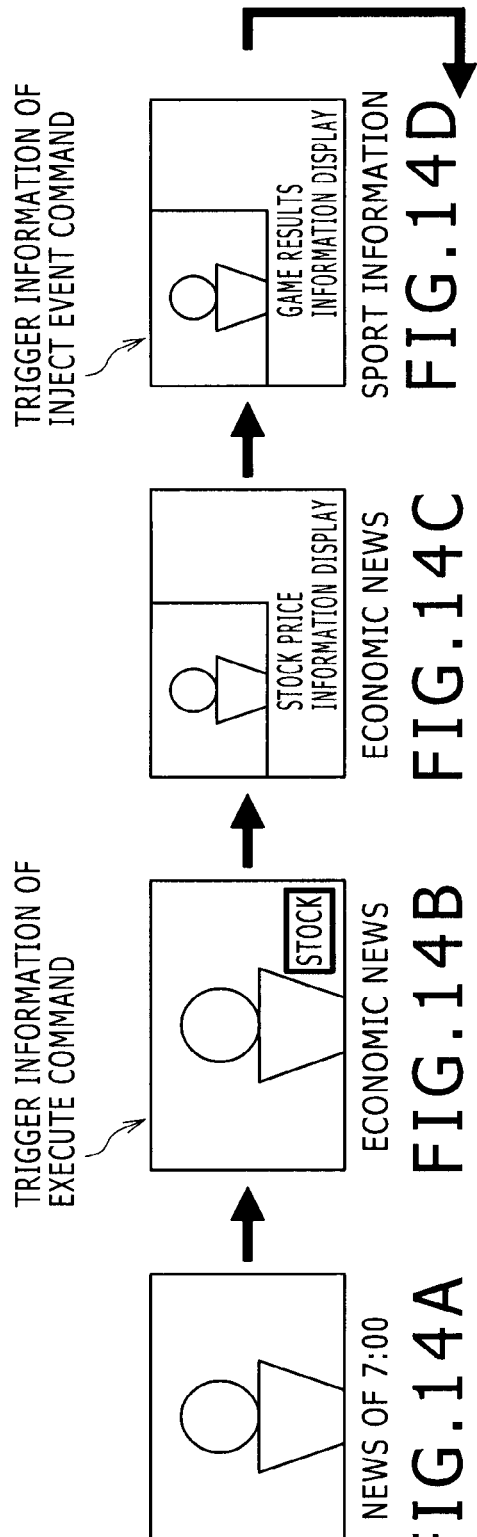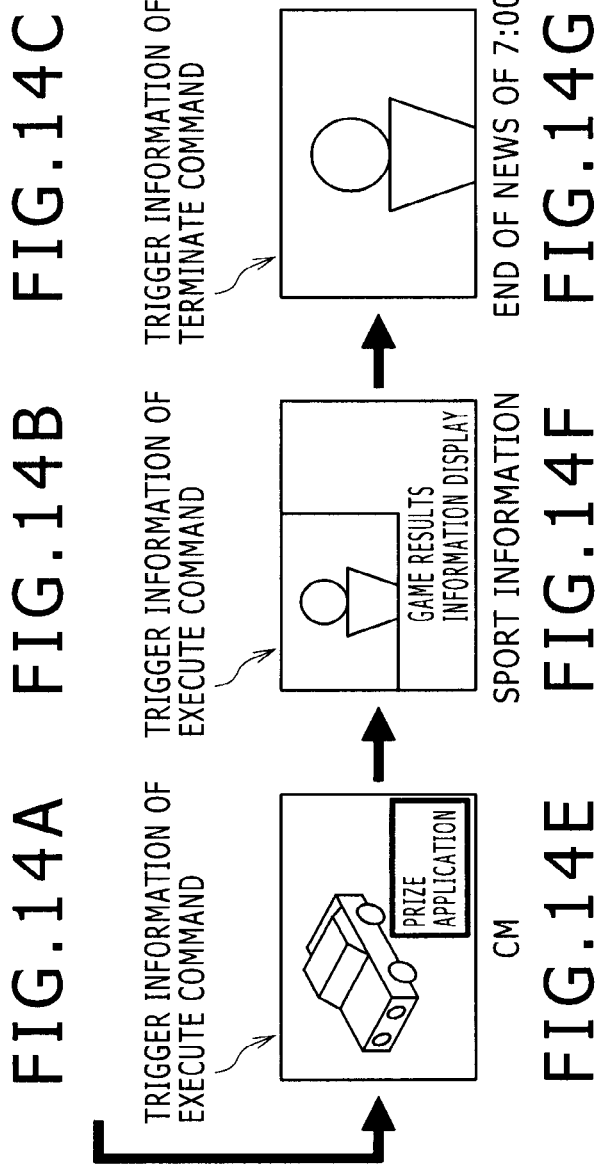

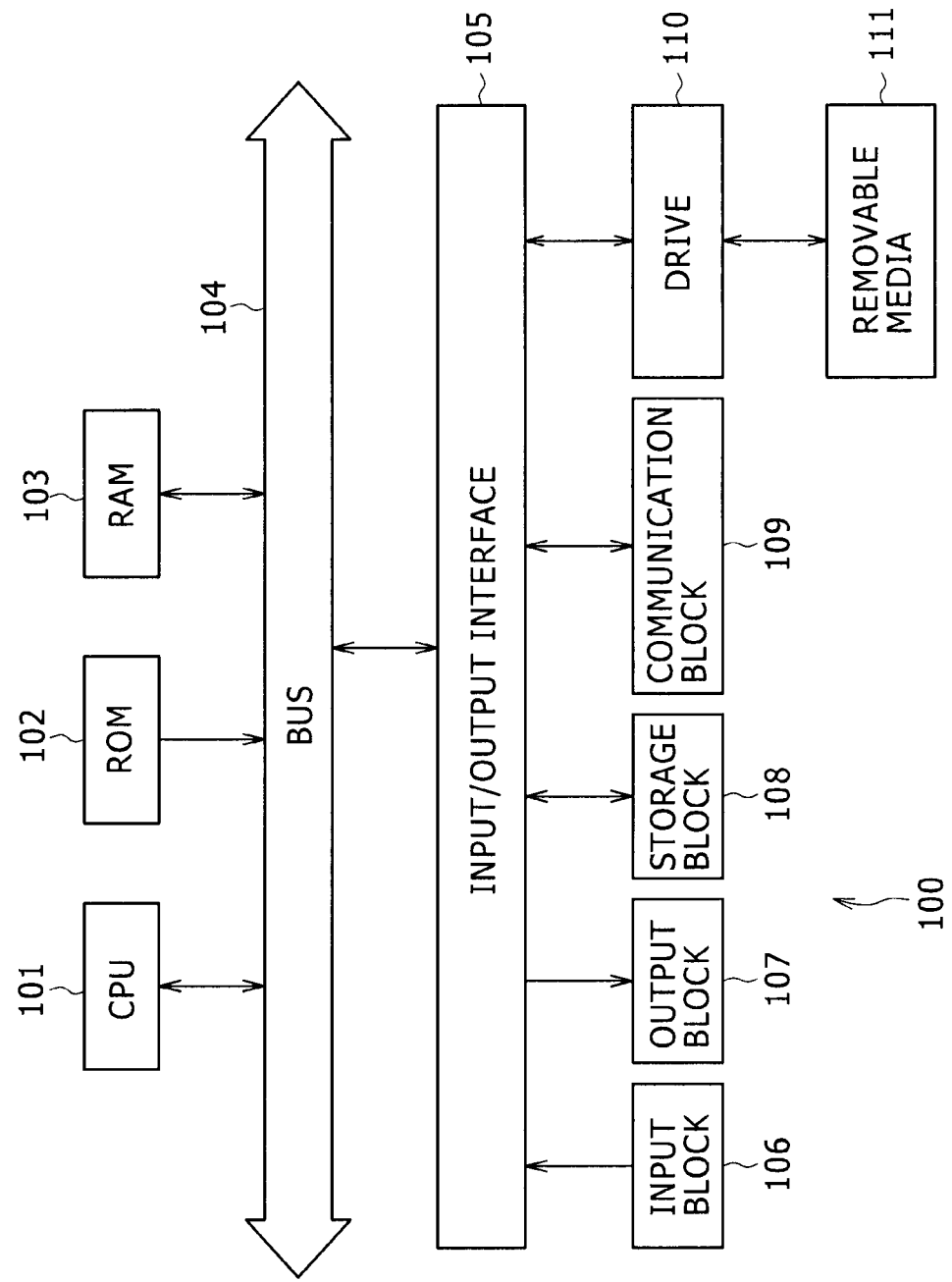

RECEPTION APPARATUS, RECEPTION METHOD, TRANSMISSION APPARATUS, TRANSMISSION METHOD, PROGRAM, AND BROADCASTING SYSTEM

CROSS-REFERENCE TO RELATED APPLICATIONS

The present application is a continuation of U.S. application Ser. No. 13/071,551 filed Mar. 25, 2011, which is a non-provisional application of and claims the benefit of priority from U.S. Application No. 61/378,225, filed Aug. 30, 2010, the entire contents of which are incorporated herein by reference.

BACKGROUND OF THE INVENTION

1. Field of the Invention

The present invention relates to a reception apparatus, a reception method, a transmission apparatus, a transmission method, a program, and a broadcasting system and, more particularly, to a reception apparatus, a reception method, a transmission apparatus, a transmission method, a program, and a broadcasting system that are configured for suitable use in executing and ending data broadcast content in conjugation with the progress of a program or a CM (Commercial Message), for example.

2. Description of the Related Art

In these days, digital television broadcasting has been promoted in Japan, resulting in the popularization of terrestrial digital broadcasting and BS (Broadcast Satellite) digital broadcasting, for example. With digital television broadcasting, such as terrestrial digital broadcasting, so-called data broadcasting has been realized in addition to program broadcasting. The content carried by this data broadcasting allows the displaying of the information associated with on-air programs as well as the information (announcement of other programs, news, weather forecast, traffic information, and so on) not associated with on-air programs (refer to Japanese Patent Laid-Open No. 2006-50237 below).

It should be noted that, in the data broadcasting in Japan, a band dedicated to data broadcasting was allocated in advance within the broadcasting band for digital television broadcasting at the time television broadcasting was digitalized. The data broadcasting of Japan was realized by broadcasting data broadcast content by use of this dedicated band.

On the other hand, the digital television broadcasting in the USA has no allocation of such a band dedicated to data broadcasting as the Japanese counterpart.

To be more specific, a broadcasting band for the current American digital television broadcasting is occupied by a video band, an audio band, and a control information band, so that no band is allocated to data broadcast content as shown in FIG. 1A. Therefore, the allocation of the band for broadcasting the content for data broadcasting to the limited broadcasting band for digital television broadcasting must narrow the video band and the audio band as shown in FIG. 1B, for example.

However, the narrowing of the video band and the audio band to allocate a band for broadcasting the content for data broadcasting does not lead to a realistic solution because of the inevitable deterioration in the picture and tone qualities of television programs.

In addition, even if the band for data broadcasting content can be allocated, the data volume that can be transmitted in band thus allocated is necessarily limited. This presents problems that the information volume of data broadcasting content runs low and an attempt to increase the information volume increases the time for the reception side to receive necessary data.

Further, because digital television program retransmission systems based on CATV (Cable TV) networks are wide spread in the USA, the following problems are encountered.

Referring to FIG. 2, there is shown an exemplary configuration of a digital television program retransmission system based on a CATV network.

This retransmission system is mainly made up of a broadcasting apparatus 1, a CATV retransmission apparatus 2, a digital television receiver 4, a STB (Set Top Box) 5, and a television receiver 6.

The broadcasting apparatus 1 installed in a broadcasting station for example broadcasts digital television broadcasting signal by use of the terrestrial wave or the satellite wave. The CATV retransmission apparatus 2 installed in a cable TV station for example receives a digital television broadcast from the broadcasting apparatus 1, removes unnecessary information from the received broadcast, adds CATV-unique information to the received broadcast, and retransmits the processed broadcast to the digital television receiver 4 and the set top box 5 via a CATV network 3.

The CATV retransmission apparatus 2 is made up of a tuner 11, a PID (Packet Identifier) filter 12 for filtering a packet having a predetermined packet ID, a CATV-unique signal generation block 13, a multiplexing block 14, and a modulation block 15.

The tuner 11 receives a digital television broadcast signal of each channel and demodulates the received signal, outputting a resultant TS (Transport Stream) to the PID filter 12. The PID filter 12 removes packets (not associated with AV (audio/video) content as a program) corresponding to a predetermined packet ID from the TS and outputs the resultant TS to the multiplexing block 14. The CATV-unique signal generation block 13 generates a packet in which information unique to this CATV station is stored and outputs the generated packet to the multiplexing block 14. The multiplexing block 14 multiplexes the output of the PID filter 12 and the output of the CATV-unique signal generation block 13 and outputs a resultant signal to the modulation block 15. The modulation block 15 modulates the output of the multiplexing block 14 by a demodulating scheme suited to the CATV network 3 and retransmits the modulated signal to the digital television receiver 4 and the set top box 5 via the CATV network 3.

The digital television receiver 4 compliant with CATV receives the TS of the digital television broadcast retransmitted via the CATV network 3 and decodes the received TS, thereby displaying a resultant video signal and outputting a resultant audio signal.

The set top box 5 compliant with CATV receives the TS of the digital television broadcast retransmitted via the CATV network 3 and decodes the received TS, thereby outputting a resultant video signal and an audio signal to the television receiver 6 via an HDMI cable for example. On the basis of the video signal and the audio signal entered from the set top box 5 via the HDMI cable for example, the television receiver 6 displays the video signal and outputs the audio signal.

As described above, in the CATV retransmission apparatus 2, a packet (not associated with AV content as a program) corresponding to a predetermined packet ID is removed from the TS of each digital broadcasting signal by the PID filter 12. For this reason, if a band for broadcasting content for data broadcasting is allocated to the broadcasting band as shown in FIG. 1B, packets stored in the content for data broadcasting may be excluded by this PID filter 12.

Therefore, the present invention addresses the above-identified and other problems associated with related-art methods and apparatuses and solves the addressed problems by providing a reception apparatus, a reception method, a transmission apparatus, a transmission method, a program, and a broadcasting system that are configured to realize the content for data broadcasting that can be executed and ended in conjugation with the progress of a television broadcast program and a CM without providing a band for data broadcasting in the broadcasting band of digital television broadcasting.

SUMMARY OF THE INVENTION

In carrying out the invention and according to a first embodiment thereof, there is provided a reception apparatus for receiving transmitted AV (Audio/Video) content. This reception apparatus has extraction means for extracting trigger information transmitted with the AV content and associated with control of an application program to be executed in conjugation with the AV content and control means for controlling, in response to a command indicated by the extracted trigger information, execution of the application program and, if a video of the AV content has been switched, executing any one of continuation and termination of the application program that is active.

If a video of the AV content is switched on the basis of execution continuation information corresponding to an application program, the control means can continue or terminate the application program that is active.

The above-mentioned execution continuation information includes any one of ES-bound in which a continuation scope of execution of the application program that is active with a video of AV content switched is within a same ES (Elementary Stream); service-bound in which a continuation scope of execution of the application program that is active with a video of AV content switched is within a same service; provider-bound in which a continuation scope of execution of the application program that is active with a video of AV content switched is within a same broadcasting organization; and un-bound in which a continuation scope of execution of the application program that is active with a video of AV content switched is not arranged.

The above-mentioned execution continuation information is included in the trigger information.

The above-mentioned execution continuation information is included in the application program.

The control means further controls acquisition and launching of the application program, event firing in the application program that is active, suspension of the application program that is active, and termination of the application program that is active in accordance with a command indicated by the extracted trigger information.

In carrying out the invention and according to the first embodiment thereof, there is provided a reception method for a reception apparatus for receiving transmitted AV content. This reception method has the steps of extracting, by the receiving apparatus, trigger information transmitted with the AV content and associated with control of an application program to be executed in conjugation with the AV content; controlling execution, by the reception apparatus, of the application program in response to a command indicated by the extracted trigger information; and controlling continuation or termination of execution, by the reception apparatus, of the application program that is active if a video of the AV content has been switched.

In carrying out the invention and according to the first embodiment thereof, there is provided a program for controlling a reception apparatus for receiving transmitted AV content. This program makes a computer of the reception apparatus execute processing that has the steps of extracting, by the receiving apparatus, trigger information transmitted with the AV content associated with control of an application program to be executed in conjugation with the AV content; controlling execution, by the reception apparatus, of the application program in response to a command indicated by the extracted trigger information; and controlling continuation or termination of execution, by the reception apparatus, of the application program that is active if a video of the AV content has been switched.

In the first embodiment of the invention, the trigger information associated with the control of an application program to be executed in conjugation with AV content is extracted, the trigger information being transmitted with the AV content. The execution of the application program is controlled in accordance with a command indicated by the extracted trigger information. If the video of the AV content is switched, the execution of the active application is continued or terminated.

In carrying out the invention and according to a second embodiment thereof, there is provided transmission apparatus for transmitting AV content. The transmission apparatus has transmission means for transmitting, along with the AV content, trigger information associated with control of an application program to be executed in a reception apparatus in conjugation with the AV content, wherein the trigger information includes execution continuation information for determining, if a video of the AV content is switched when the application program is active in the reception apparatus, continuation or termination of execution of the application program that is active.

In the reception apparatus, the execution continuation information includes any one of ES-bound in which a continuation scope of execution of the application program that is active with a video of AV content switched is within a same ES; service-bound in which a continuation scope of execution of the application program that is active with a video of AV content switched is within a same service; provider-bound in which a continuation scope of execution of the application program that is active with a video of AV content switched is within a same broadcasting organization; and un-bound in which a continuation scope of execution of the application program that is active with a video of AV content switched is not arranged.

A command indicated by the trigger information includes at least one of commands for controlling acquisition and launching of the application program, event firing in the application program that is active, suspension of the application program that is active, and termination of the application program that is active.

In carrying out the invention and according to the second embodiment thereof, there is provided a transmission method for a transmission apparatus for transmitting AV content. This transmission method has the step of transmitting, by the transmission apparatus, along with the AV content, trigger information associated with control of an application program to be executed in a reception apparatus in conjugation with the AV content; wherein the trigger information includes execution continuation information for determining, if a video of the AV content is switched when the application program is active in the reception apparatus, continuation or termination of execution of the application program that is active.

In carrying out the invention and according to the second embodiment thereof, there is provided a program for controlling a transmission apparatus for transmitting AV content, the program making a computer of the transmission apparatus execute processing. This processing has the step of transmitting, by the transmission apparatus, along with the AV content, trigger information associated with control of an application program to be executed in a reception apparatus in conjugation with the AV content. The trigger information includes execution continuation information for determining, if a video of the AV content is switched when the application program is active in the reception apparatus, continuation or termination of execution of the application program that is active.

In the second embodiment of the invention, the trigger information associated with the control of an application program to be executed in the reception apparatus in conjugation with AV content is transmitted with the AV content. This trigger information includes the execution continuation information for determining to continue or terminate the execution of the active application program when the video of the AV content is switched with the application program being active in the reception apparatus.

In carrying out the invention and according to a third embodiment thereof, there is provided a broadcasting system. This broadcasting system is made up of a transmission apparatus for transmitting AV content and a reception apparatus for receiving the transmitted AV content. The above-mentioned transmission apparatus has transmission means for transmitting, along with the AV content, trigger information associated with control of an application program to be executed in a reception apparatus in conjugation with the AV content. The above-mentioned reception apparatus has extraction means for extracting trigger information transmitted with the AV content and control means for controlling, in response to a command indicated by the extracted trigger information, execution of the application program and, if a video of the AV content has been switched, executing continuation or termination of the application program that is active.

In the third embodiment of the invention, the trigger information associated with the control of an application program to be executed in the reception apparatus in conjugation with AV content is transmitted from the transmission apparatus along with AV content. On the other hand, the trigger information transmitted with the AV content is extracted. In accordance with a command indicated by the extracted trigger information, the execution of the application program is controlled. If the video of the AV content is switched, the execution of the active application program is continued or terminated.

According to the first embodiment of the invention, data broadcasting content can be terminated in response to a user operation for switching the video of television broadcasting.

According to the second embodiment of the invention, an operation of data broadcasting content in the reception apparatus can be controlled in conjugation with the progress of a program or a CM of television broadcasting.

According to the third embodiment of the invention, an operation of data broadcasting content in the reception apparatus can be controlled in conjugation with the progress of a program or a CM of television broadcasting.

BRIEF DESCRIPTION OF THE DRAWINGS

Other features of the invention will become apparent from the following description of embodiments with reference to the accompanying drawings in which:

FIG. 8 is a diagram illustrating items included in the trigger information of a precache command;

FIG. 9 is a diagram illustrating items included in the trigger information of an execute command;

FIG. 10 is a diagram illustrating items included in the trigger information of an inject event command;

FIG. 11 is a diagram illustrating items included in the trigger information of a suspend command;

FIG. 12 is a diagram illustrating items included in the trigger information of a terminate command;

FIG. 13 is a diagram illustrating one example of a syntax of trigger information;

FIGS. 14A, 14B, 14C, 14D, 14E, 14F, and 14G are diagrams illustrating display examples to be obtained when a data broadcasting application program is executed in conjugation with the progress of programs and CMs;

FIG. 24 is a block diagram illustrating an exemplary configuration of a computer.

DETAILED DESCRIPTION OF THE PREFERRED EMBODIMENTS

This invention will be described in further detail by way of embodiments thereof with reference to the accompanying drawings.

[Exemplary Configuration of a Broadcasting System]

Figure 3:
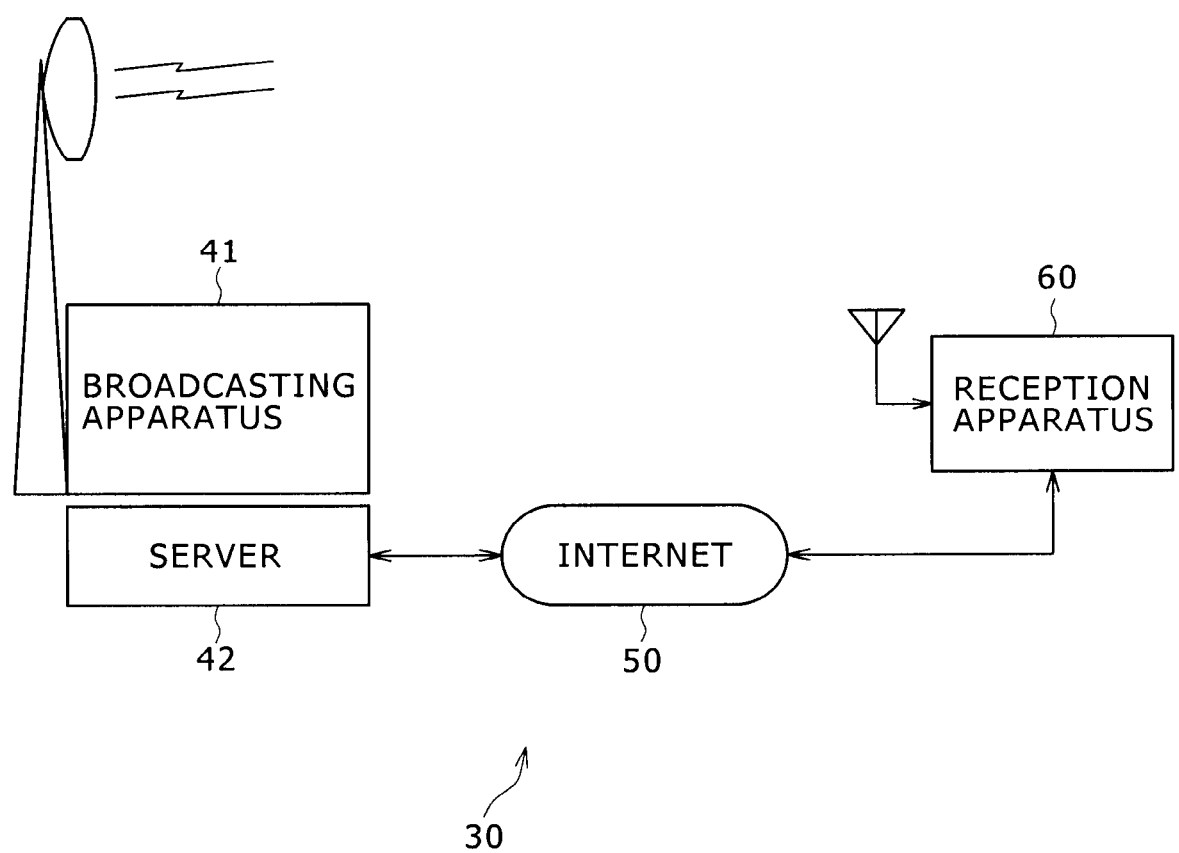
FIG. 3 is a schematic block diagram illustrating an exemplary configuration of a broadcasting system practiced as one embodiment of the present invention.

Now, referring to FIG. 3, there is shown a broadcasting system practiced as one embodiment of the present invention. This broadcasting system 30 is configured to realize the content for data broadcasting capable of linking with AV content such as a program and a CM in a state where no band is provided for broadcasting the content for data broadcasting in the broadcasting band for digital television broadcasting as with the current state in USA for example.

It should be noted that the content for data broadcasting is realized by the execution of an application program supplied to a reception apparatus by the computer thereof, so that the content for data broadcasting is hereafter referred to a data broadcasting application program or a data broadcasting application.

This broadcasting system 30 is made up of a broadcasting apparatus 41 and a server 42 arranged on the side of a broadcasting station and a reception apparatus 60 arranged on the receiver side.

The broadcasting apparatus 41 is configured to transmit digital television broadcasting signals. In addition, the broadcasting apparatus 41 includes, in a digital television broadcasting signal, trigger information that is a command for specifying the execution of the content for data broadcasting to be executed in conjugation with a program and a CM, thereby transmitting the trigger information as included in the digital television broadcasting signal. To be more specific, trigger information is multiplexed with a transport stream (TS) of a digital television broadcasting signal or embedded in a video signal for transmission.

The trigger information includes the information about an acquisition source of a data broadcasting application, in addition to the information indicative of command type. Details of the trigger information will be described later.

The server 42 supplies data broadcasting applications in response to a request from the reception apparatus 60 that has accessed the server 42 via the Internet 50.

The reception apparatus 60 receives a digital broadcasting signal broadcast from the broadcasting apparatus 41 and outputs the video and audio of AV content (a television program, a CM, and so on) to a display monitor, not shown. In addition, the reception apparatus 60 accesses the server 42 via the Internet 50 to obtain a data broadcasting application. It should be noted that this reception apparatus 60 may be arranged as a standalone unit or as incorporated in a television receiver or a video recorder, for example.

[Exemplary Configuration of the Reception Apparatus]

Figure 4:
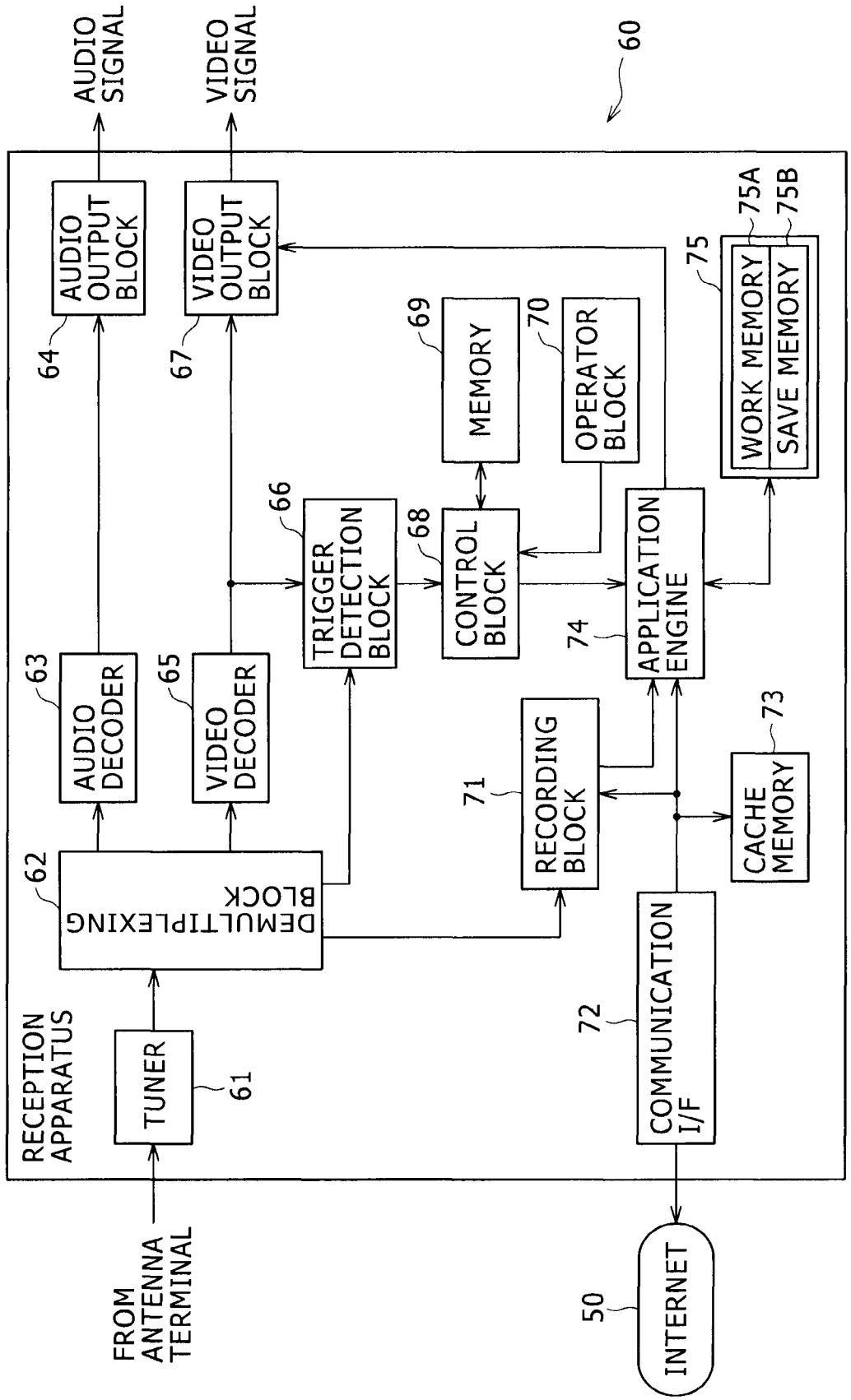
FIG. 4 is a block diagram illustrating an exemplary configuration of a reception apparatus practiced as another embodiment of the present invention.

Referring to FIG. 4, there is shown an exemplary configuration of the reception apparatus 60. The reception apparatus 60 is made up of a tuner 61, a demultiplexer 62, an audio decoder 63, an audio output block 64, a video decoder 65, a trigger detection block 66, a video output block 67, a control block 68, a memory 69, an operator block 70, a recording block 71, a communication I/F 72, a cache memory 73, an application engine 74, and an application memory 75.

The tuner 61 receives a digital television broadcasting signal corresponding to a channel selected by a user, demodulates the received signal, and outputs a resultant TS to the demultiplexer 62. The demultiplexer 62 separates the TS supplied from the tuner 61 into an audio encoded signal, a video encoded signal, and a control signal and supplies these signals to the audio decoder 63, the video decoder 65, and the control block 68, respectively.

In addition, the demultiplexer 62 extracts a PCR (Program Clock Reference) packet that includes the trigger information arranged in the TS and outputs the extracted PCR packet to the trigger detection block 66.

The audio decoder 63 decodes the entered audio encoded signal and outputs a resultant audio signal to the audio output block 64. The audio output block 64 outputs the entered audio signal to a subsequent stage (a loudspeaker for example).

The video decoder 65 decodes the entered video encoded signal and outputs a resultant video signal to the trigger detection block 66 and the video output block 67.

The trigger detection block 66 always monitors the entered video signal to detect trigger information embedded in the video signal and outputs the detected trigger information to the control block 68 (if the trigger information is arranged only in a TS, the operation of this trigger detection block 66 is not required). In addition, the trigger detection block 66 extracts trigger information from a PCR packet entered from the demultiplexer 62 and outputs the extracted trigger information to the control block 68.

The video output block 67 outputs the video signal entered from the video decoder 65 to a subsequent stage (a display monitor for example). In addition, the video output block 67 combines the video signal of the data broadcasting application entered from the application engine 74 and the video signal entered from the video decoder 65 and outputs a resultant signal to a subsequent stage.

The control block 68 controls the entire reception apparatus 60 by executing a control program stored in the memory 69. Also, on the basis of the trigger information entered from the trigger detection block 66, the control block 68 controls the acquisition, launching, event-firing, pausing, and terminating of the data broadcasting application.

The memory 69 stores the control program that is executed by the control block 68. This control program can be updated on the basis of the update data that is obtained from a digital television broadcasting signal or via the Internet 50. The operator block 70 receives operations done by the user and supplies the operation signals corresponding to the operations to the control block 68.

If the data broadcasting application is distributed by use of a digital television broadcast signal, the recording block 71 downloads the distributed data broadcasting application to store the downloaded data broadcasting application in a recording media incorporated in the recording block 71.

The communication I/F 72 connects the reception apparatus 60 to the server 42 via the Internet 50 under the control of the application engine 74. Under the control of the control block 68, the application engine 74 obtains a data broadcasting application from the server 42 via the communication I/F 72 and the Internet 50 and stores the data broadcasting application in the cache memory 73.

Under the control of the control block 68, the application engine 74 reads the data broadcasting application from the recording block 71 or the cache memory 73 to execute the data broadcasting application.

The application memory 75 is composed of a work memory 75A and a save memory 75B. The application engine 74 stores data (to be more specific, the data including the layer of displayed information) associated with the active data broadcasting application into the work memory 75A. If the application engine 74 suspends the active data broadcasting application, the application engine 74 moves the data in the work memory 75A of the application memory 75 to the save memory 75B. To restart the suspended data broadcasting application, the application engine 74 moves the data from the save memory 75B to the work memory 75A to resume the state as it was before the pausing.

It should be noted that the two areas of the same size in the application memory 75 may be alternately specified as the work memory 75A and the save memory 75B. This memory switching arrangement eliminates the necessity of moving data between the work memory 75A and the save memory 75B.

[Trigger Information Transmission Method]

The following describes a method of transmitting trigger information.

Figure 5:
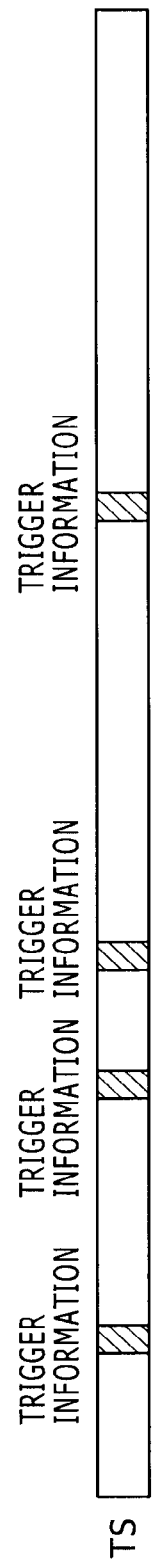
FIG. 5 is a diagram illustrating a concept of transmitting trigger information as stored in a PCR packet of a TS.

Referring to FIG. 5, there is shown a concept in which trigger information is transmitted as stored in a PCR packet of a TS of a digital television broadcast signal.

Figure 1:
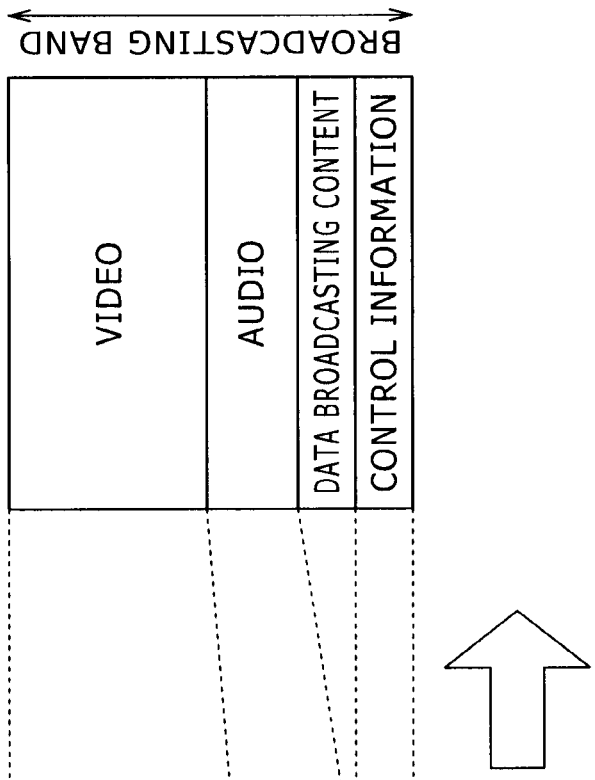
FIGS. 1A and 1B are diagrams illustrating a broadcasting band for digital television broadcasting.
Figure 2:
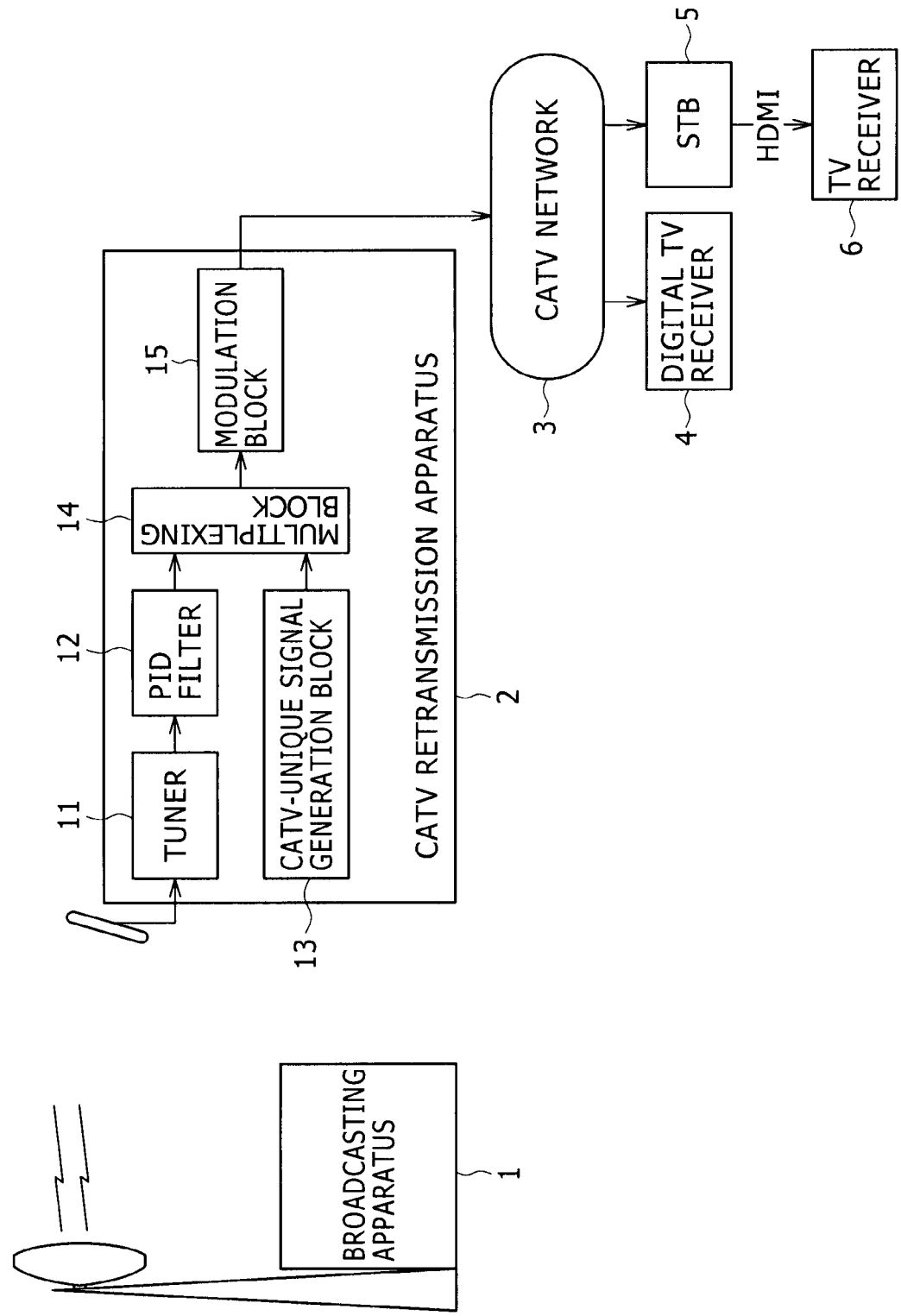
FIG. 2 is a schematic block diagram illustrating an exemplary configuration of a related-art CATV retransmission system.

Trigger information is distributed as stored in a PCR packet corresponding to a proper timing for linking with a program or a CM. Therefore, as shown in the figure, trigger information is not stored in all PCR packets. Normally, each PCR packet passes a PID filter 12 of the CATV retransmission apparatus 2 as shown in FIG. 2, so that trigger information can be supplied also to a reception apparatus (the digital television receiver 4 shown in FIG. 2) that uses a CATV network.

It should be noted that trigger information is consecutively transmitted two or more times in the same content in consideration of a reception failure due to a wave trouble or a drop (a reception failure) in the reception apparatus 60.

Figure 6:
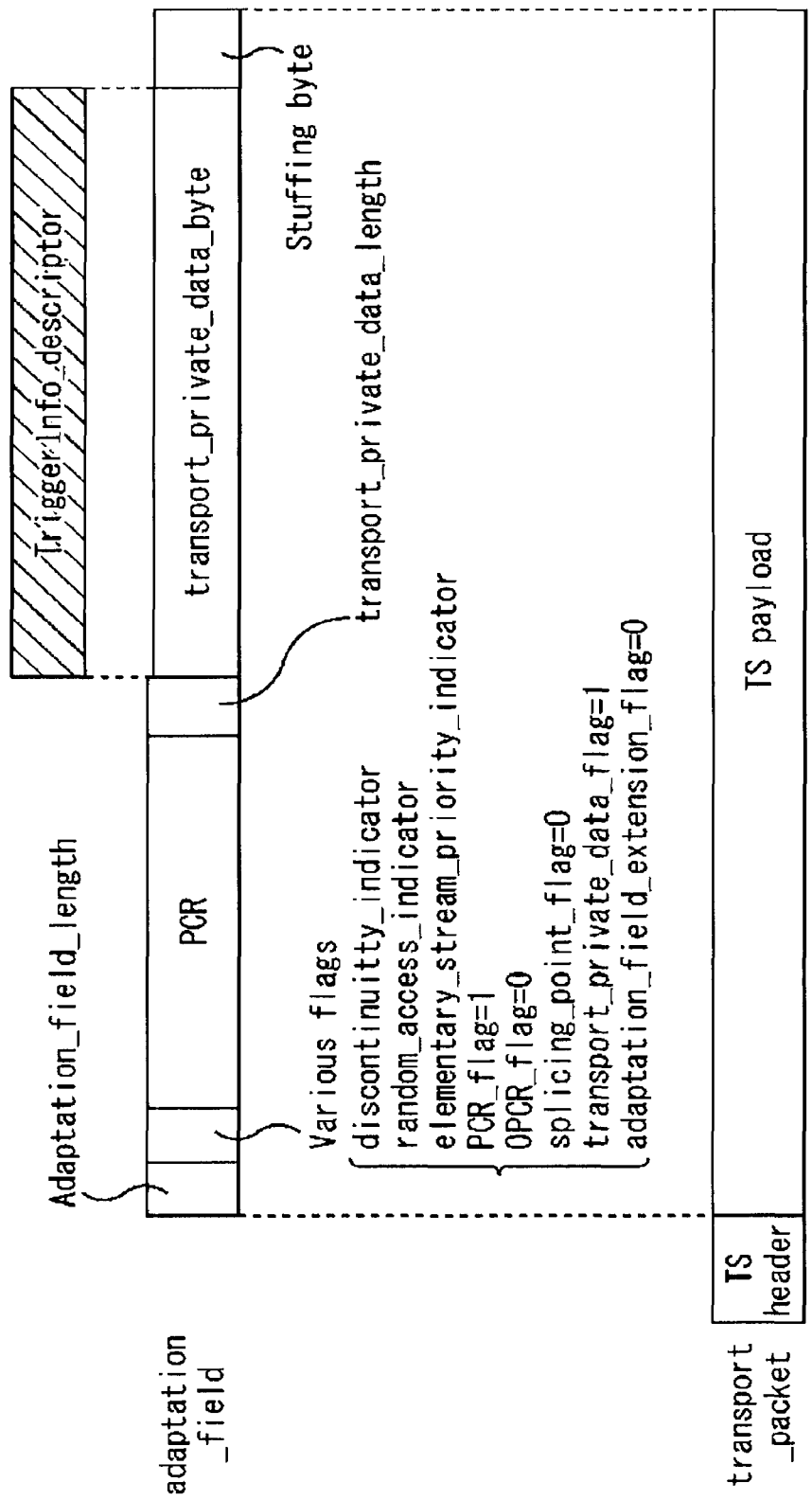
FIG. 6 is a diagram illustrating a specific arrangement of a trigger information in the PCR packet.

Referring to FIG. 6, there is shown the arrangement of trigger information in a PCR packet. With a PCR packet, PCR is stored in adaptation field of a TS packet, in which trigger information (Trigger_Info_descriptor in the figure) is stored in transport_private_data_byte subsequent to PCR. It should be noted that, if trigger information is stored, transport_private_data_flag of Various_flags arranged in front of PCR is set to "1."

In the above-mentioned example, trigger information is transmitted as stored in a PCR; however, the storage and transmission of trigger information is not restricted to this method. For example, trigger signal may be embedded in video information itself.

Figure 7A:
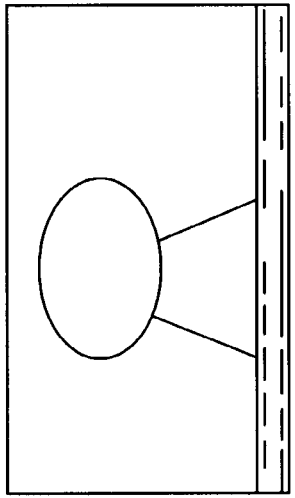
FIGS. 7A and 7B are diagrams illustrating examples of embedding a trigger information in a video signal.
Figure 7B:
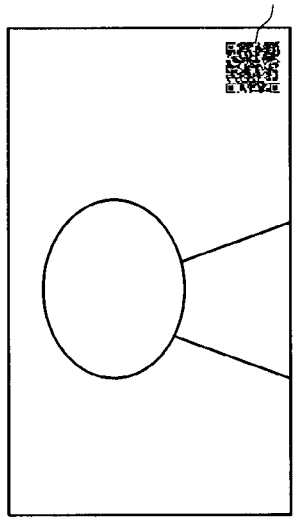

Referring to FIGS. 7A and 7B, there are shown two types of examples of embedding trigger information in a video signal.

FIG. 7A shows an example in which trigger information is two-dimensionally barcoded to be superimposed on a predetermined location (the lower right corner in this case) of the image of a video signal. FIG. 7B shows an example in which trigger information is video-coded to be superimposed on the lower several lines of the image of a video signal. The trigger information shown in FIG. 7A and FIG. 7B is detected by the trigger detection block 66 of the reception apparatus 60.

In each of the examples shown in FIG. 7A and FIG. 7B, the trigger information is arranged on the screen of a television program, so that the trigger information can be supplied to any reception apparatuses (the television receiver 6 shown in FIG. 2 for example) that uses a CATV network.

In each of the examples shown in FIG. 7A and FIG. 7B, the trigger information (a two-dimensional barcode or a video code) on the screen is visually recognizable by the user of the reception apparatus 60; however, if this is not desired, the two-dimensional barcode or the video code may be masked by the pixels therearound before being displayed.

[Detail of Trigger Information]

The following describes details of trigger information. Trigger information is classified according to commands indicated by the trigger information. There are five types of commands; pre-cache command, execute command, inject event command, suspend command, and terminate command. It is also practicable to add other commands to the above-mentioned commands.

Referring to FIG. 8, there are shown items included in trigger information that is a pre-cache command. A pre-cache command causes the reception apparatus 60 to acquire a data broadcasting application.

In the pre-cache command, Trigger_id is information for identifying this trigger information. If pieces of trigger information having the same contents are transmitted two or more times, each piece of trigger information has the same Trigger_id. Protocol_version is indicative of the version of a protocol of this trigger information. Command_code is indicative of the type of the command of this trigger information. In the example shown in FIG. 8, Command_code has information indicative of a pre-cache command.

Trigger_validity is a value indicative of the probability with which each reception apparatus 60 that received this trigger information executes processing according to this trigger information. Provision of this value can prevent, if two or more reception apparatuses 60 attempt to obtain the data broadcasting application from the server 42, the concentration of the access by these apparatuses. For example, in order to distribute the access to the server 42 by many reception apparatuses 60 into four groups, the same trigger information may be transmitted four times: namely, in the first trigger information, server access distribution parameter N=4; in the second trigger information, server access distribution parameter N=3; in the third trigger information, server access distribution parameter N=2; and in the fourth trigger information, server access distribution parameter N=1.

App_id is information for identifying a data broadcasting application to be obtained in correspondence with this trigger information. App_type is information indicative of the type (HTML5, BML, Java or the like for example) of the data broadcasting application corresponding to this trigger information. App_url is the URL of the acquisition source (the server 42 in this case) of the data broadcasting application.

Broadcast_App_flag, Downloaded_App_flag, and Internet_App_flag are indicative of locations of the program data of the data broadcasting applications corresponding to this trigger information. Broadcast_App_flag is set to "1" if the data broadcasting application corresponding to this trigger information is obtainable from a digital television broadcast signal. Downloaded_App_flag is set to "1" if the data broadcasting application corresponding to this trigger information has already been broadcast by a downloaded broadcast service and therefore is obtainable from a local storage (the recording block 71 for example) if the data broadcasting application has been received by the reception apparatus 60. Internet_App_flag is set to "1" if the data broadcasting application corresponding to this trigger information is obtainable from the application server 42 via the Internet 50.

Referring to FIG. 9, there are shown items included in trigger information that is an execute command. An execute command causes the reception apparatus 60 to launch a data broadcasting application.

Trigger_id, Protocol_version, Command_code, Trigger_validity, App_id, App_type, App_url, Broadcast_App_flag, Downloaded_App_flag, and Internet_App_flag are substantially the same as those of the trigger information that is a pre-cache command shown in FIG. 8. A difference, however, lies in that Command_code has information indicative of an execute command.

App_life_scope included in the trigger information has information indicative of a condition for continuing the execution of the data broadcasting application launched in response to the trigger information as this a execute command being executed in the case where various video switching operations (details thereof will be described later) have been executed by he user.

To be more specific, App_life_scope has one of ES-bound, service-bound, provider-bound, and un-bound.

ES-bound denotes that, only during the same video ES is decoded and reproduced, the execution of the data broadcasting application is continued. Namely, for example, in responding to a case where video having different viewpoints are switched within the same program, the active data broadcasting application is terminated.

Service-bound denotes that, only during a period in which the same service is selected (namely, the same channel is selected), the execution of the data broadcasting application is continued. Namely, when service switching is executed, the active data broadcasting application is terminated.

Provider-bound denotes that, only during a period in which a service from the same provider (namely, the broadcasting organization) is received, the execution of the data broadcasting application is continued. Namely, in the switching between services of the same provider, the execution of the data broadcasting application is continued; if switching between services of different providers is executed, the active data broadcasting application is terminated.

Un-bound denotes that, if a video switching operation is executed, the execution of the data broadcasting application is continued. Namely, for example, if services are switched, the active data broadcasting application is not terminated; only when the trigger information that is a terminate command to be described later is received, the active data broadcasting application is terminated.

If video switching operation is executed by the user by arranging App_life_scope in the trigger information that is an execute command, control for continuously executing the data broadcasting application is practicable if this switching operation is made in the same service or the same broadcasting organization. In addition, control for continuously executing the data broadcasting application common to all services (channels) is practicable.

App_expire_date included in the trigger information is indicative the date on which to terminate the active data broadcasting application without receiving a terminate command.

Referring to FIG. 10, there are shown items included in trigger information that is an inject event command. An inject event command causes the reception apparatus 60 to fire an event in the active data broadcasting application.

Trigger_id, Protocol_version, Command_code, Trigger_validity, App_id, and App_type are substantially the same those of the trigger information that is a pre-cache command shown in FIG. 8. A difference, however, lies in that Command_code has information indicative of an inject event command.

Event_id is identification information about an even to be fired in the data broadcasting application specified by App_id. Event embedded data has data that is referenced when firing the event.

Referring to FIG. 11, there are shown items included in trigger information that is a suspend command. A suspend command causes the reception apparatus 60 to suspend the active data broadcasting application.

Trigger_id, Protocol_version, Command_code, Trigger_validity, App_id, and App_type are substantially the same as those of the trigger information that is a pre-cache command shown in FIG. 8. A difference, however, lies in that Command_code has information indicative of a suspend command.

Referring to FIG. 12, there are shown items included in trigger information that is a terminate command. A terminate command causes the reception apparatus 60 to terminate the active data broadcasting application.

Trigger_id, Protocol_version, Command_code, Trigger_validity, App_id, and App_type are substantially the same as those of the trigger information that is a pre-cache command shown in FIG. 8. A difference, however, lies in that Command_code has information indicative of a terminate command.

[Syntax of Trigger Information]

Referring to FIG. 13, there is shown an example of a syntax of trigger information compliant with the trigger information that is each of the commands described above. It should be noted that the syntax of trigger information is not restricted to that shown in FIG. 13. Any other syntaxes are available.

[Explanation of Operations]

The following describes operations of the reception apparatus 60 that operates according to trigger information.

Referring to FIGS. 14A to 14G, there are shown transitions between the display screens of the reception apparatus 60 when the data broadcasting application corresponding to a television program or a CM is executed by the reception apparatus 60.

For example, as shown in FIG. 14A, when a television program (in this example, "News of 7:00") is being broadcast and the contents of the program transition to economic information, the trigger information of an execute command for the data broadcasting application corresponding to the program is transmitted. When this trigger information is received, the data broadcasting application is launched and, on the screen on which the program is displayed, an icon (in this example, "Stock") for prompting the user to display the data broadcasting application is displayed as shown in FIG. 14B.

When the user clicks this icon, the display (in this example, stock price information display) by the data broadcasting application is executed as shown in FIG. 14C. Thus, only when the icon for prompting the user to display the data broadcasting application is displayed, the display by the data broadcasting application is executed, thereby preventing the trouble for the user who does not require the display by the data broadcasting application.

When the contents of the program further transition (in this example, to sport information), the trigger information of an inject event command is transmitted in response. When the inject event command is received, an event is fired, thereby changing the display by the data broadcasting application on the screen as shown in FIG. 14D (in this example, to game results information display).

Next, the trigger information of the suspend command for the active data broadcasting application corresponding to the program is transmitted. When this trigger information is received, the data broadcasting application corresponding to the program is suspended. Then, the trigger information of the execute command for the data broadcasting application corresponding to a CM is transmitted. Then this trigger information is received, the data broadcasting application of the CM program is launched. Consequently, an icon (in this example, "Prize Application") for prompting the user to display the data broadcasting application corresponding to the CM is displayed on the screen on which the CM is displayed as shown in FIG. 14E.

When the user clicks this icon, the display (in this example, the display for prize application) is executed on the screen by the data broadcasting application corresponding to the CM.

When the CM ends, the trigger information of the execute command for the data broadcasting application corresponding to the program is transmitted corresponding to the resumption of the program. When this trigger information is received, the display of the data broadcasting application corresponding to the CM is deleted as shown in FIG. 14F and the display of the data broadcasting application of the program is also resumed from the state of the suspension done before.

Then, when the program ends, the trigger information of a terminate command for the data broadcasting application corresponding to the program is transmitted. When this trigger information is received, the display of the data broadcasting application is deleted from the screen as shown in FIG. 14G and only the video of the program is displayed.

It should be noted that a data broadcasting application can be displayed not only by a method in which the display of a program is shrunk to provide the area for displaying the data broadcasting application as shown in FIGS. 14A to 14G, but also by another method in which the display of a data broadcasting application is superimposed on the display of a program, for example.

Figure 15:
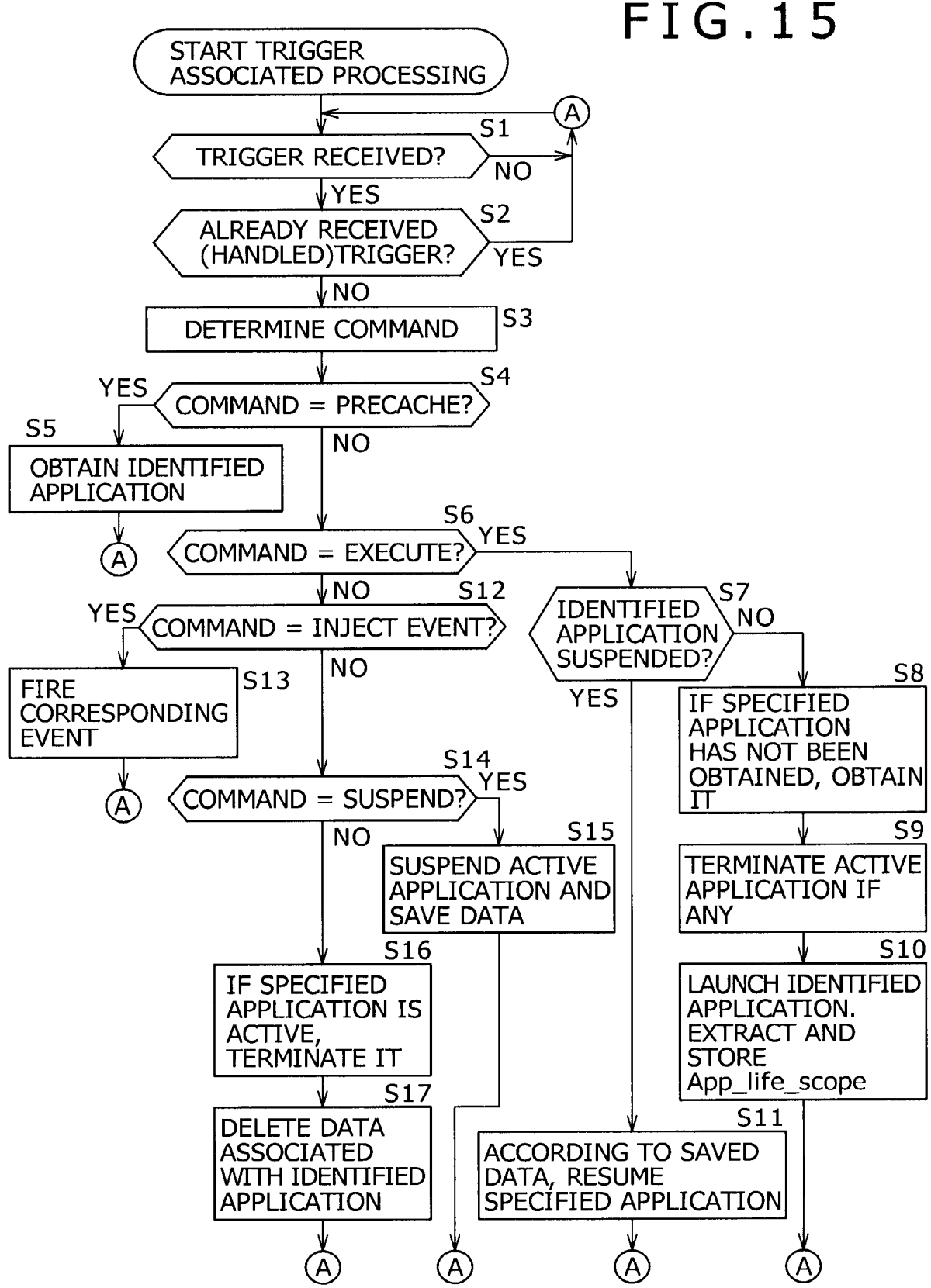
FIG. 15 is a flowchart indicative of trigger information responding processing.

The following describes an operation (hereafter referred to trigger information handling processing) to be executed upon reception of trigger information by the reception apparatus 60 with reference to FIG. 15.

Referring to FIG. 15, there is shown a flowchart indicative of the trigger information handling processing. This trigger information handling processing is repeatedly executed while the user is viewing a television program, namely, while the reception apparatus 60 is receiving digital television broadcast signals.

In step S1, the trigger detection block 66 waits until a PCR packet including trigger information is entered from the demultiplexer 62 or trigger information is detected from a video signal outputted from the video decoder 65. When a PCR packet including trigger information is entered or trigger information is detected from a video signal, the procedure goes to step S2.

In step S2, the trigger detection block 66 outputs trigger information to the control block 68. The control block 68 reads Trigger_id of the received trigger information to determine whether the processing of step S3 and subsequent steps has already been executed on this trigger information. If the processing of step S3 and subsequent steps is found executed on this trigger information, then the procedure is returned to step S1 to repeat the above-mentioned processing therefrom. By contrast, if the processing of step S3 and subsequent steps is found not executed on this trigger information, then the procedure goes to step S3.

In step S3, the control block 68 reads Command_code of the trigger information to determine whether the command indicated by this trigger information is any one of pre-cache, execute, inject event, suspend, and terminate commands.

In step S4, the control block 68 determines whether the decision result in step S3 is a pre-cache command. If the decision result is found to be a pre-cache command, then the procedure goes to step S5.

In step S5, the program data of the data broadcasting application identified by App_id of this trigger information is obtained. To be more specific, if Broadcast_App_flag of this trigger information is "1," then the program data of the data broadcasting identified by App_id is obtained from the television broadcasting signal to be recorded to the recording block 71. If Downloaded_App_flag of this trigger information is "1," then the program data of the data broadcasting application identified by App_id is obtained from the recording block 71 that is a local storage. If Internet_App_flag of this trigger information is "1," then the program data of the data broadcasting application identified by App_id is obtained from the server 42 via the Internet 50 to be recorded to the cache memory 73. It should be noted that if two or more of Broadcast_App_flag, Downloaded_App_flag, and Internet_App_flag are "1," then, in accordance with the condition of the reception apparatus 60, the program data of the data broadcasting application identified by App_id of this trigger information can be obtained. Subsequently, the procedure is returned to step S1 to repeat the above-mentioned processing therefrom.

In step S4, if the decision result in step S3 is found not to be a pre-cache command, then the procedure goes to step S6. In step S6, the control block 68 determines whether the decision result in step S3 is an execute command. If the decision result is found to be an execute command, then the procedure goes to step S7.

In step S7, under the control of the control block 68, the application engine 74 determines whether the data broadcasting application identified by App_id of this trigger is suspended. To be more specific, the application engine 74 determines that the data broadcasting application is suspended if the data indicative of suspension of the data broadcasting application identified by App_id is saved to the save memory 75B.

In step S7, if the data broadcasting application identified by App_id is found not suspended, then the procedure goes to step S8. In step S8, under the control of the control block 68, the application engine 74 obtains the program data of the data broadcasting application identified by App_id if this program data has not been obtained (that is, this program data is not found in the recording block 71 or the cache memory 73).

In step S9, under the control of the control block 68, the application engine 74 terminates the active data broadcasting application if any.

In step S10, under the control of the control block 68, the application engine 74 launches the data broadcasting application identified by App_id. The control block 68 extracts App_life_scope from the trigger information, relates the extracted App_life_scope with the launched data broadcasting application, and stored App_life_scope. Then, App_life_scope stored here is referenced in the interrupt processing that is executed when a video switching operation is done by the user (details will be described later with reference to FIG. 19). Then, the procedure is returned to step S1 to repeat the above-mentioned processing therefrom.

It should be noted that, if the data broadcasting application identified by App_id is found suspended in step S7, then the procedure goes to step S11. In step S11, under the control of the control block 68, the application engine 74 moves the data from the save memory 75B to the work memory 75A and launches the data broadcasting application identified by App_id. Consequently, the suspended data broadcasting application identified by App_id is resumed from the suspended state. Then, the procedure is returned to step S1 to repeat the above-mentioned processing therefrom.

In step S6, if the decision result in step S3 is found not to be an execute command, then the procedure goes to step S12. In step S12, the control block 68 determines whether the decision result in step S3 is an inject event command. If the decision result is found to be an inject event command, then the procedure goes to step S13.

In step S13, the control block 68 controls the application engine 74 only when App_id of this trigger information matches App_id of the active data broadcasting application, thereby firing (executing) the event corresponding to Event_id of trigger information in the active application. Next, the procedure is returned to step S1 to repeat the above-mentioned processing therefrom.

In step S12, if the decision result in step S3 is found not to be an inject event command, then the procedure goes to step S14. In step S14, the control block 68 determines whether the decision result in step S3 is a suspend command. If the decision result is found to be a suspend command, then the procedure goes to step S15.

In step S15, under the control of the control block 68, the application engine 74 saves the data (namely, the data currently stored in the work memory 75A; if the information to be displayed has a layer structure, this data includes the information indicative of the layer of the displayed information) indicative of the currently active data broadcasting application to the save memory 75B. Then, the procedure is returned to step S1 to repeat the above-mentioned processing therefrom.

In step S14, if the decision result in step S3 is found not to be a suspend command, then the decision result in step S3 should have been a terminate command, so that the procedure goes to step S16. In step S16, under the control of the control block 68, the application engine 74 terminates the data broadcasting application identified by App_id if this data broadcasting application is active. In step S17, under the control of the control block 68, the application engine 74 deletes the data associated with the data broadcasting application identified by App_id from the work memory 75A and the save memory 75B and, at the same time, deletes the program data of the data broadcasting application from the recording block 71 or the cache memory 73. Then, the procedure is returned to step S1 to repeat the above-mentioned processing therefrom.

Here, the description of the trigger information handling processing has been completed. The above-mentioned trigger information handing processing allows the launching of a data broadcasting application, the firing of an event, and terminating the data broadcasting application in conjugation with a television program or a CM. Further, the trigger information handling processing allows the suspension of a data broadcasting application in an active state and the resumption of the suspended data broadcasting application.

Figure 16:
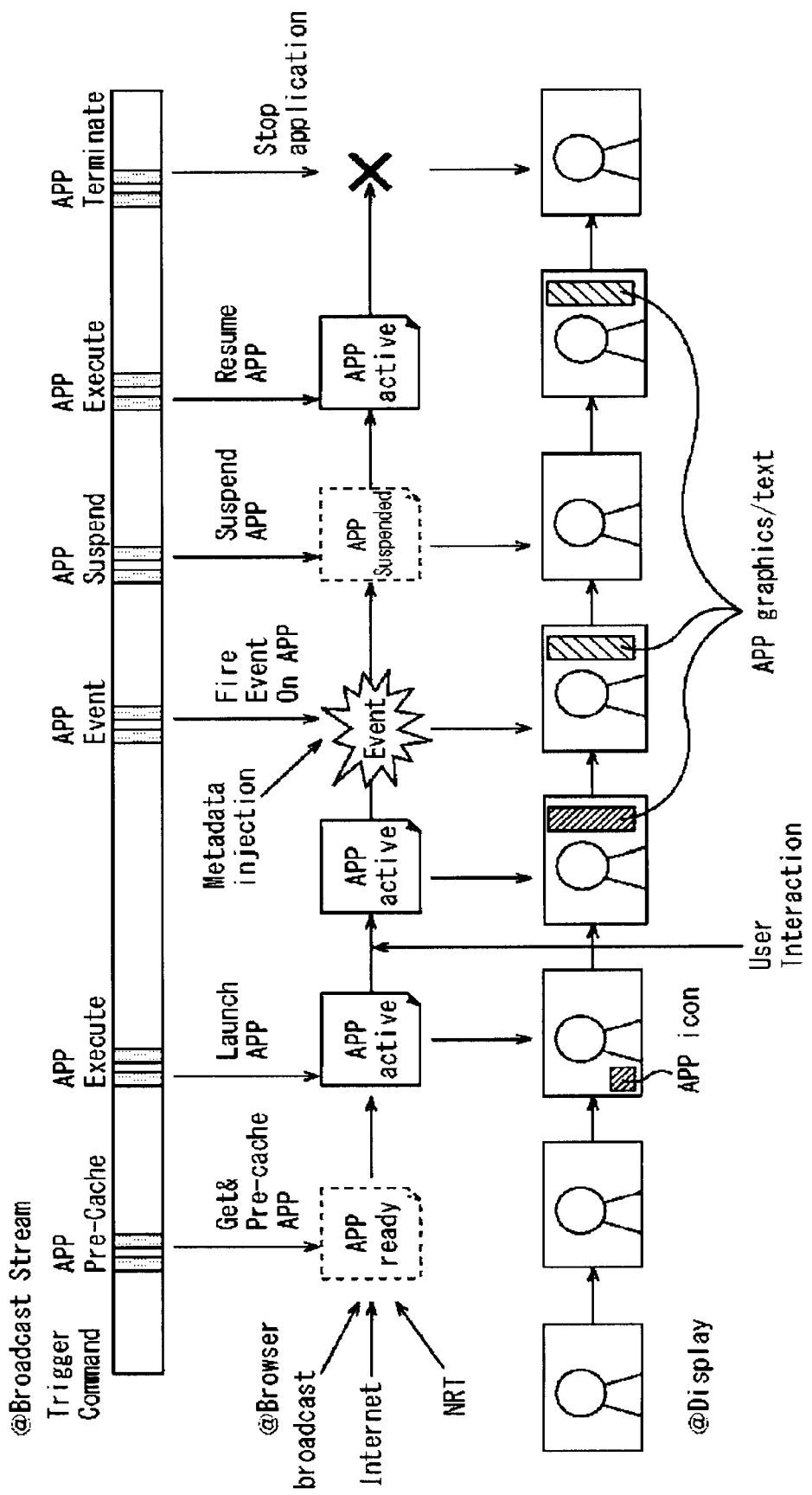
FIG. 16 is a diagram illustrating an exemplary operation scenario of a data broadcasting application program.

In addition, the above-mentioned trigger information handling processing allows the operation of data broadcasting application as shown in FIG. 16.

[Operation Scenario of Data Broadcasting Application]

Referring to FIG. 16, there is shown one example of an operation scenario of a data broadcasting application.

When the broadcasting apparatus 41 transmits the trigger information of a pre-cache command for specifying the acquisition of the data broadcasting application corresponding to a program along the progress of a television program to the reception apparatus 60, the reception apparatus 60 obtains the specified data broadcasting application.

Next, when the broadcasting apparatus 41 transmits the trigger information of an execute command for launching the data broadcasting application corresponding to the program to the reception apparatus 60, the reception apparatus 60 launches the data broadcasting application. Upon this launching, an icon for prompting the user to display the data broadcasting application is displayed on the video of the program in a superimposed manner.

When the user clicks this icon, the display by the data broadcasting application is superimposed on the screen of the video of the program.

When the broadcasting apparatus 41 transmits the trigger information of an inject event command for specifying the firing of an event to the reception apparatus 60 along the progress of the television program, the reception apparatus 60 fires the event in the active data broadcasting application (for example, the display is changed).

Then, when the broadcasting apparatus 41 transmits the trigger information of a suspend command for suspending the data broadcasting application to the reception apparatus 60 with a predetermined timing, the reception apparatus 60 suspends the active data broadcasting application (the associated data is held in the save memory 75B). Next, when the broadcasting apparatus 41 transmits the trigger information of an execute command for specifying the launching (or resuming) the data broadcasting application to the reception apparatus 60, the reception apparatus 60 resumes the suspended data broadcasting application.

Further, when the broadcasting apparatus 41 transmits the trigger information of a terminate command for specifying the termination of the data broadcasting application upon the end of the television program to the reception apparatus 60, the reception apparatus 60 terminates the active data broadcasting application.

[Status Transitions of Data Broadcasting Application]

Figure 17:
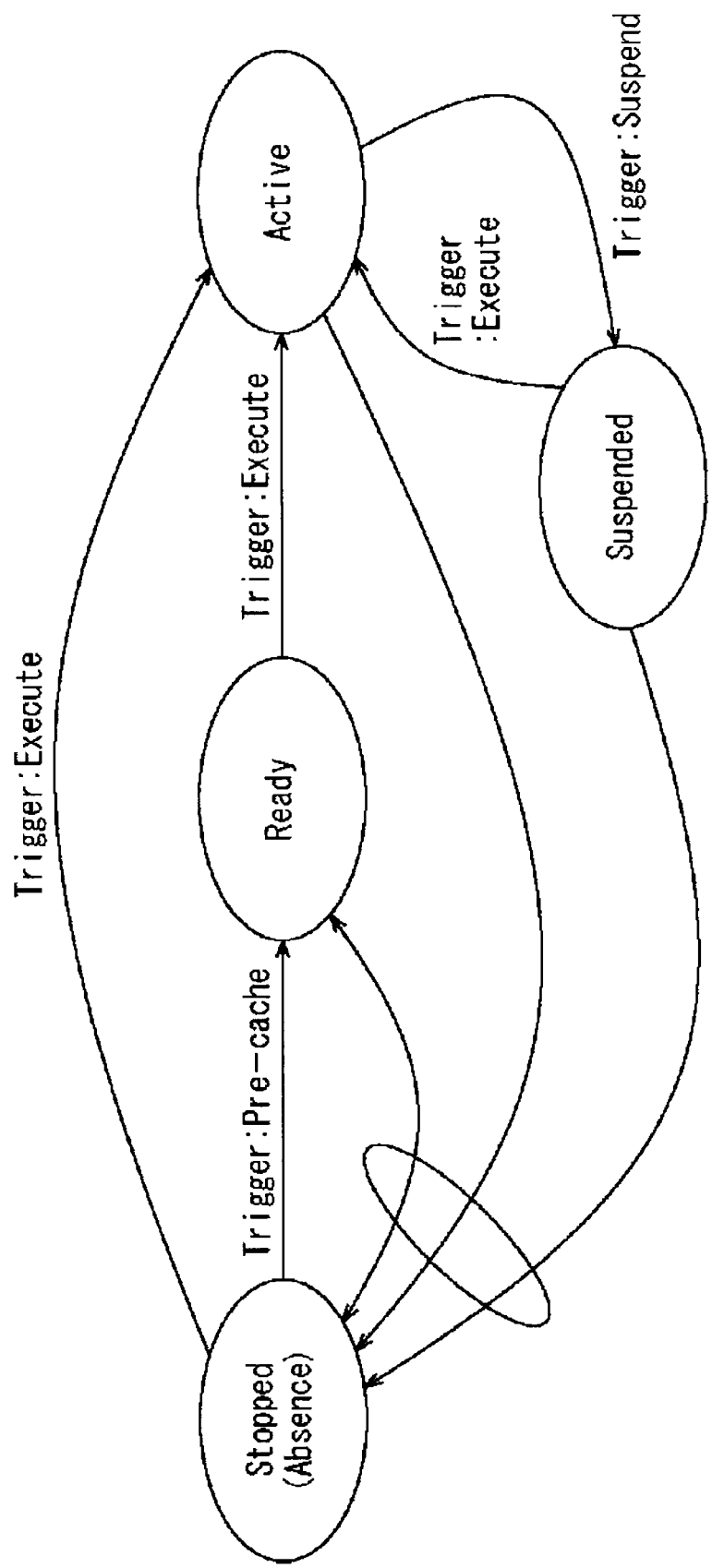
FIG. 17 is a schematic diagram illustrating status transitions of a data broadcasting application program.

Now, referring to FIG. 17, there is shown status transitions of a data broadcasting application in the reception apparatus 60.

As shown in FIG. 17, a data broadcasting application transitions to any one of four types of states; a stopped state, a ready state, an active state, and a suspended state.

In the stopped state, a data broadcasting application is not executed and the program data of the data broadcasting application has not been obtained. In the ready state, the program data of the data broadcasting application has already been obtained but the data broadcasting application is not executed. In the active state, the data broadcasting application has been launched and is being executed. In the suspended state, the execution of the data broadcasting application is discontinued and the information indicative of the discontinued state is held in the save memory 75B.

If the trigger information of a pre-cache command has been received with a data broadcasting application transitioned to the stopped state and the program data of the data broadcasting application is obtained, the data broadcasting application transitions to the ready state.

If the trigger information of an execute command has been received with a data broadcasting application transitioned to the stopped state or the ready state and the data broadcasting application is launched, the data broadcasting application transitions to the active state.

If the trigger information of a suspend command has been received with a data broadcasting application transitioned to the active state and the active data broadcasting application is suspended, the data broadcasting application transitions to the suspended state.

If the trigger information of an execute command has been received with the a data broadcasting application transitioned to the suspended state and the suspended data broadcasting application is resumed, the data broadcasting application transitions to active state.

If the trigger information of a terminate command has been received with a data broadcasting application transitioned to a ready state, an active state, or a suspended state, the data broadcasting application in the ready state, the active state, or the suspended state transitions to a stopped state. It should be noted that the transition to a stopped state may take place not only on the basis of the trigger information of a terminate command, but also by the reception channel switching that is executed upon execution of another data broadcasting application after passing of App_expire_date in trigger information.

[Interrupt Processing According to a Video Switching Operation by User]

The following describes interrupt processing (hereafter referred to as video switching interrupt processing) according to a video switching operation by the user that is executed on the reception apparatus 60. Before this description, various video switching operations are explained.

Figure 18:
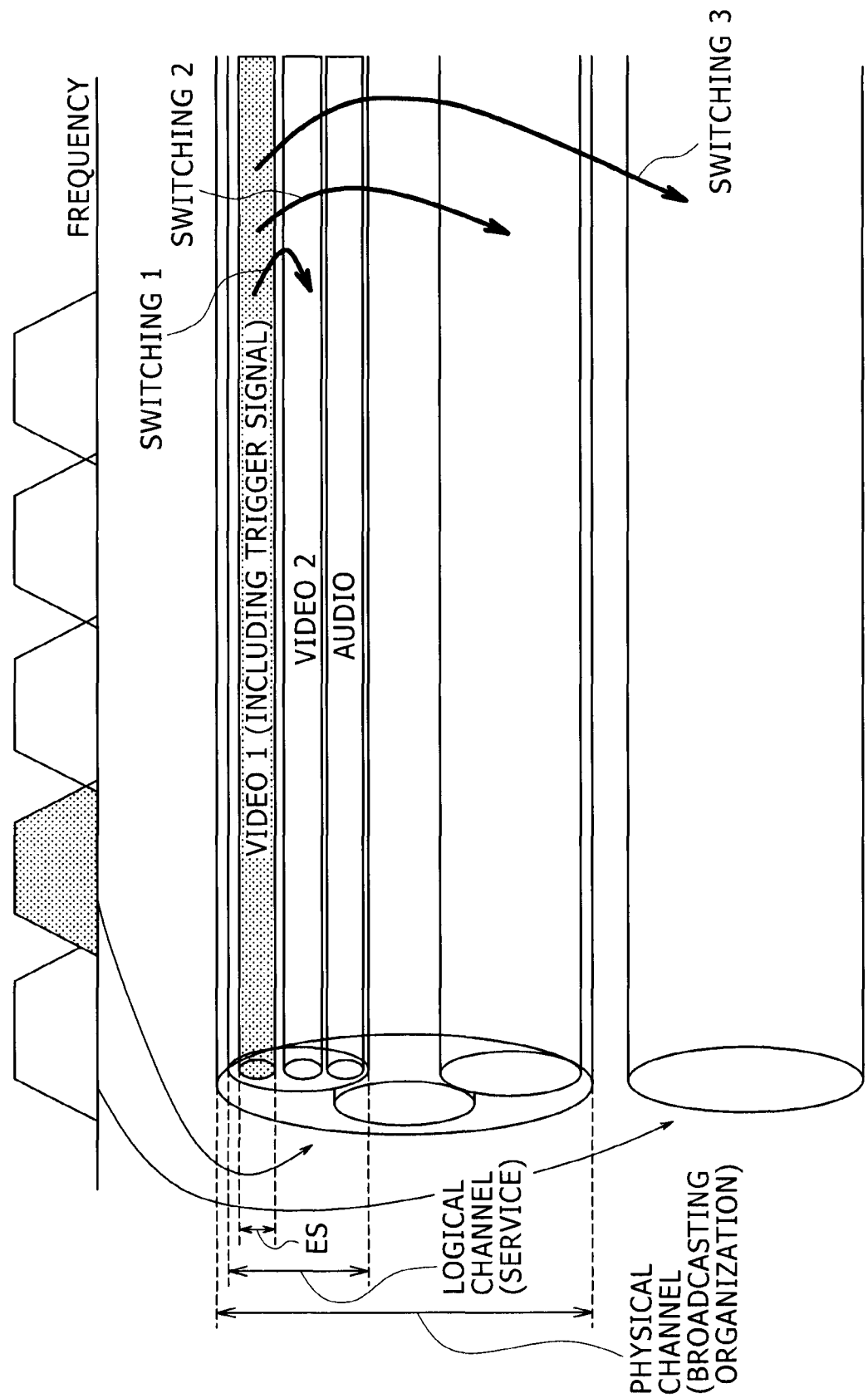
FIG. 18 is a schematic diagram illustrating an exemplary configuration of a digital broadcasting signal.

Referring to FIG. 18, there is shown a configuration of a terrestrial digital broadcasting signal that is one example of digital television broadcasting.

For a terrestrial digital broadcasting signal, a physical channel having a band of 6 MHz (or 8 MHz) on the frequency axis is arranged. Each broadcasting organization occupies one physical channel to execute broadcasting. It should be noted that two or more physical channels may also be occupied by a single broadcasting organization.

Each physical channel is made up of one or more services (also referred to as logical channels). These services are equivalent to so-called channels that are changed to switch between programs received on the reception apparatus 60. With each physical channel, a list of services included therein and selection information (equivalent to VCT (Virtual Channel Table) in ATSC (Advanced Television Systems Committee, Inc.) or NIT (Network Information Table) in DVB (Digital Video Broadcasting) or ARIB (Association of Radio Industries and Businesses)) indicative of broadcasting frequencies are broadcast. PID of PMT (Program Map Table) of each service is written to PAT (Program Association Table) of each physical channel.

Each service (or logical channel) includes one or more ESs. For example, with a program compatible with multi-view by which videos from different view points (or camera positions) can be switched, two or more ESs are included. PID of each ES is written to PMT of each service.

With the configuration described above, the video switching operation by the user is any one of the three types, switching 1 through switching 3, as shown in FIG. 18. To be more specific, switching 1 is used video ES change switching in the same service. Switching 2 is the switching between video ESs in the same physical channel. Switching 3 is the switching to another physical channel. It should be noted that, with switching 3, a broadcasting organization of the physical channel of the switching source and a broadcasting organization of the physical channel of the switching destination are the same or different.

Figure 19:
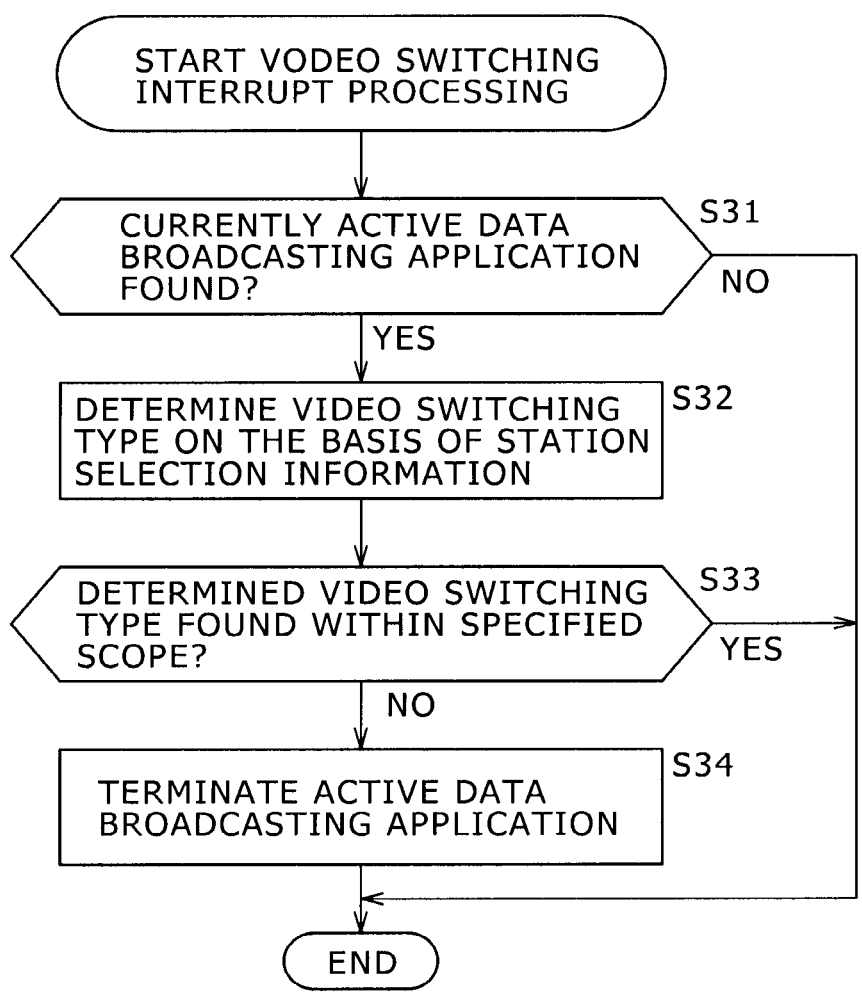
FIG. 19 is a flowchart indicative of video switching interrupt processing.

The following describes the video switching interrupt processing. FIG. 19 is a flowchart indicative of the video switching interrupt processing.

This video switching interrupt processing is executed when any one of the above-mentioned video switching operation is executed by the user.

In step S31, the control block 68 determines whether a data broadcasting application currently transitioned to the active state exists. If such a data broadcasting application is found existing, then the procedure goes to step S32. It should be noted that, if no data broadcasting application transitioned to the active state is found existing, this video switching interrupt processing ends.

In step S32, the control block 68 determines, on the basis of the station selection information obtained from television broadcasting signal being received, the type of a video switching operation that has triggered the start of this video switching interrupt processing. To be more specific, the control block 68 determines which of switching 1 through switching 3 shown in FIG. 18 is the type of the switching operation. If the switching operation is found to be switching 3, the control block 68 further determines whether the broadcasting organization of the physical channel of the switching source is the same as the broadcasting organization of the physical channel of the switching destination.

In step S33, the control block 68 determines whether the switching operation type determined in step S32 is in the scope indicated by App_life_scope stored as related with the active data broadcasting application. If the switching operation type is found to be within App_life_scope, then this video switching interrupt processing ends. Namely, the active data broadcasting application is kept active.

By contrast, if the video switching operation type determined in step S32 is found to be outside the scope indicated by App_life_scope, the procedure goes to step S34. In step S34, the control block 68 controls the application engine 74 to terminate the active data broadcasting application. Under the control of the control block 68, the application engine 74 is terminated the active data broadcasting application, deletes the data associated with the execution of the data broadcasting application from the work memory 75A and the save memory 75B, and deletes the program data of the data broadcasting application from the recording block 71 or the cache memory 73.

Here, the video switching interrupt processing has been completed. According to the video switching interrupt processing described above, the active state of a data broadcasting application can be continued or terminated depending on the types of video switching operations.

It should be noted that the video switching interrupt processing described above is executed for a data broadcasting application in the active state; however, it is also practicable to execute the video switching interrupt processing on a data broadcasting application transitioned to the suspended state.

[Operation Scenario of Video Switching Interrupt Processing]

The following describes an exemplary scenario of the video switching interrupt processing described above.

Figure 20:
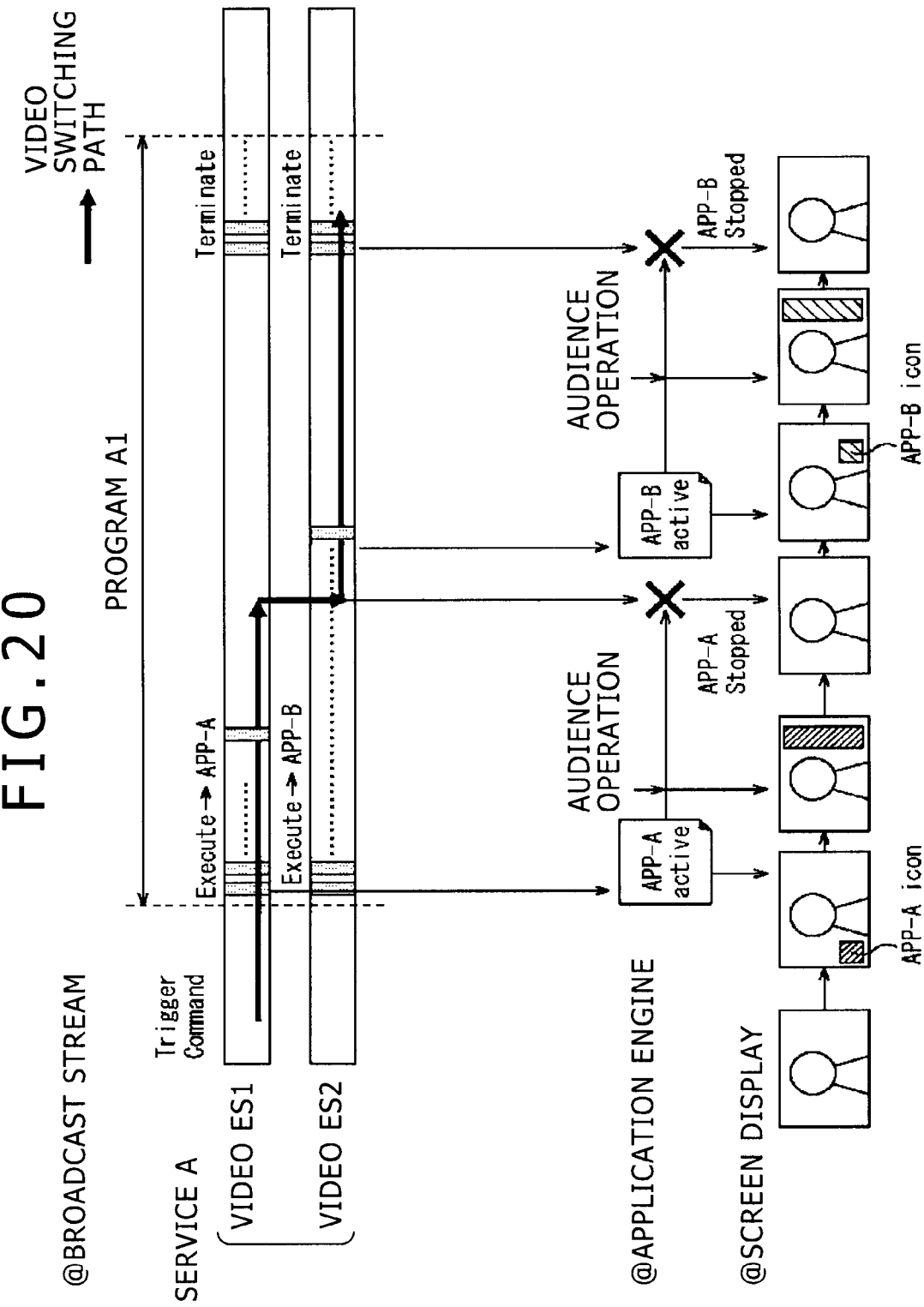
FIG. 20 is a schematic diagram illustrating an operation scenario when App_life_scope is ES-bound.

Referring to FIG. 20, there is shown an operation scenario with App_life_scope of an active data broadcasting application being ES-bound.

When the trigger information of an execute command for data broadcasting application App-A is received with video ES1 received and displayed by the reception apparatus 60 in multiview-compatible program A1 being broadcast by a service (or so-called channel) A, the data broadcasting application App-A is launched accordingly. Next, when the user executes an operation for switching the video of program A1 to the video ES2, the video switching interrupt processing is executed. In this example, because an ES change has took place, the active data broadcasting application App-A is terminated.

Next, when the trigger information of an execute command corresponding to a data broadcasting application App-B transmitted by a video ES2 of service A is required, the data broadcasting application App-B is launched accordingly. Then, if the user does not execute a video switching operation, the launched data broadcasting application App-B is terminated in accordance with the trigger information of a terminate command transmitted at the termination of program A1.

Figure 21:
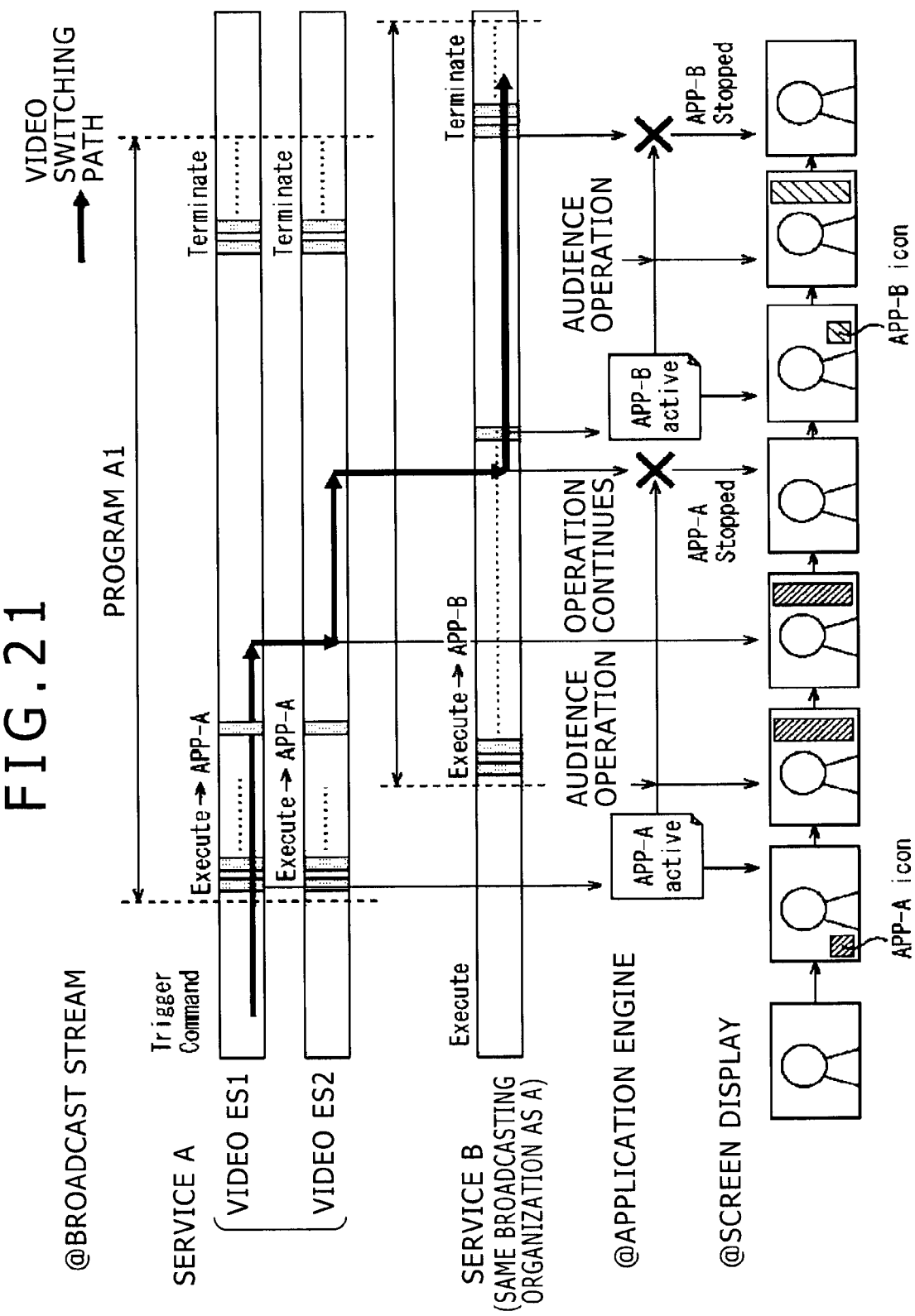
FIG. 21 is a schematic diagram illustrating an operation scenario when App_life_scope is service-bound.

Referring to FIG. 21, there is shown an operation scenario with App_life_scope of an active data broadcasting application being service-bound.

When the trigger information of execute command for the data broadcasting application App-A is received while the reception apparatus 60 is receiving and displaying the video ES1 of multiview-compatible program A1 being broadcast by service A, the data broadcasting application App-A is launched accordingly. Then, when the user executes a switching operation for switching the video of program A1 to the video ES2, the video switching interrupt processing is executed. In this example, the video switching is in the same service, so that the active data broadcasting application App-A is continuously executed.

Then, if the station selection is changed to program B1 being broadcast in service B, the video switching interrupt processing is executed again. In this example, the video switching is executed in different services, so that the active data broadcasting application App-A is terminated.

Next, when the trigger information of an execute command corresponding to the data broadcasting application App-B transmitted in service B is received, the data broadcasting application App-B is launched accordingly. Then, if the user does not execute a video switching operation, the launched data broadcasting application App-B is terminated in accordance with the trigger information of a terminate command to be transmitted upon termination of program B1.

Figure 22:
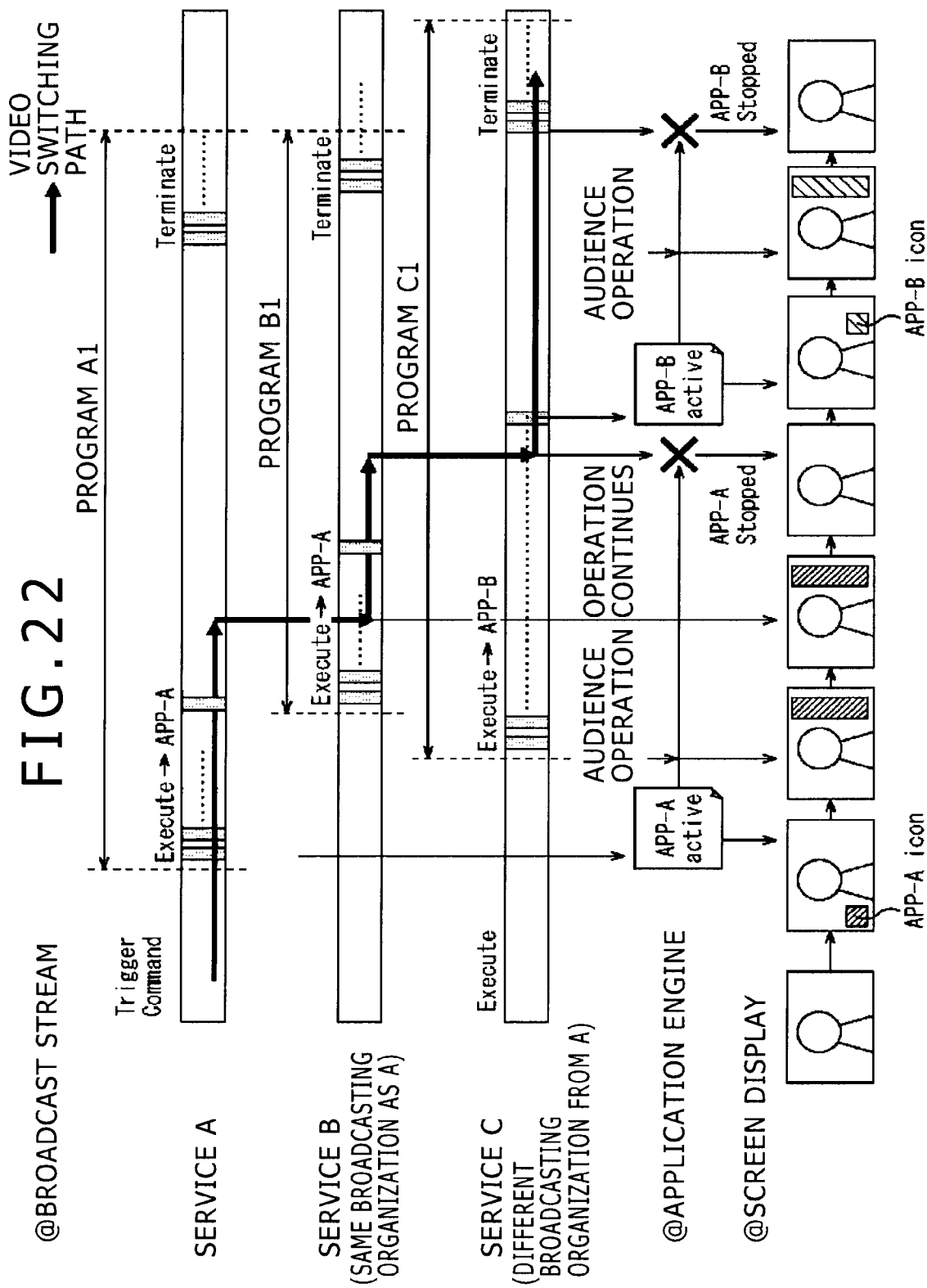
FIG. 22 is a schematic diagram illustrating an operation scenario when App_life_scope is provider-bound.

Referring to FIG. 22, there is shown an operation scenario to be executed when App_life_scope of an active data broadcasting application is provider-bound.

When the trigger information of an execute command for the data broadcasting application App-A is received with program A1 being broadcast in service A received and displayed by the reception apparatus 60, the data broadcasting application App-A is launched accordingly. Then, if the station selection is changed to program B1 being broadcast in service B by the same broadcasting organization as that of service A, the video switching interrupt processing is executed. In this example, the video is switched within the same broadcasting organization, the active data broadcasting application App-A is continuously executed.

Next, if the station selection is changed to program C1 being broadcast in service C by a different broadcasting organization than that of services A and B, then the video switching interrupt processing is executed again. In this example, the video switching is taken place between different broadcasting organizations, so that the active data broadcasting application App-A is terminated.

Next, when the trigger information of an execute command for the data broadcasting application App-B being transmitted in service C is received, the data broadcasting application App-B is launched accordingly. Then, if the user does not execute a video switching operation, the launched data broadcasting application App-B is terminated in accordance with the trigger information of a terminate command to be transmitted at the termination of program C1.

Figure 23:
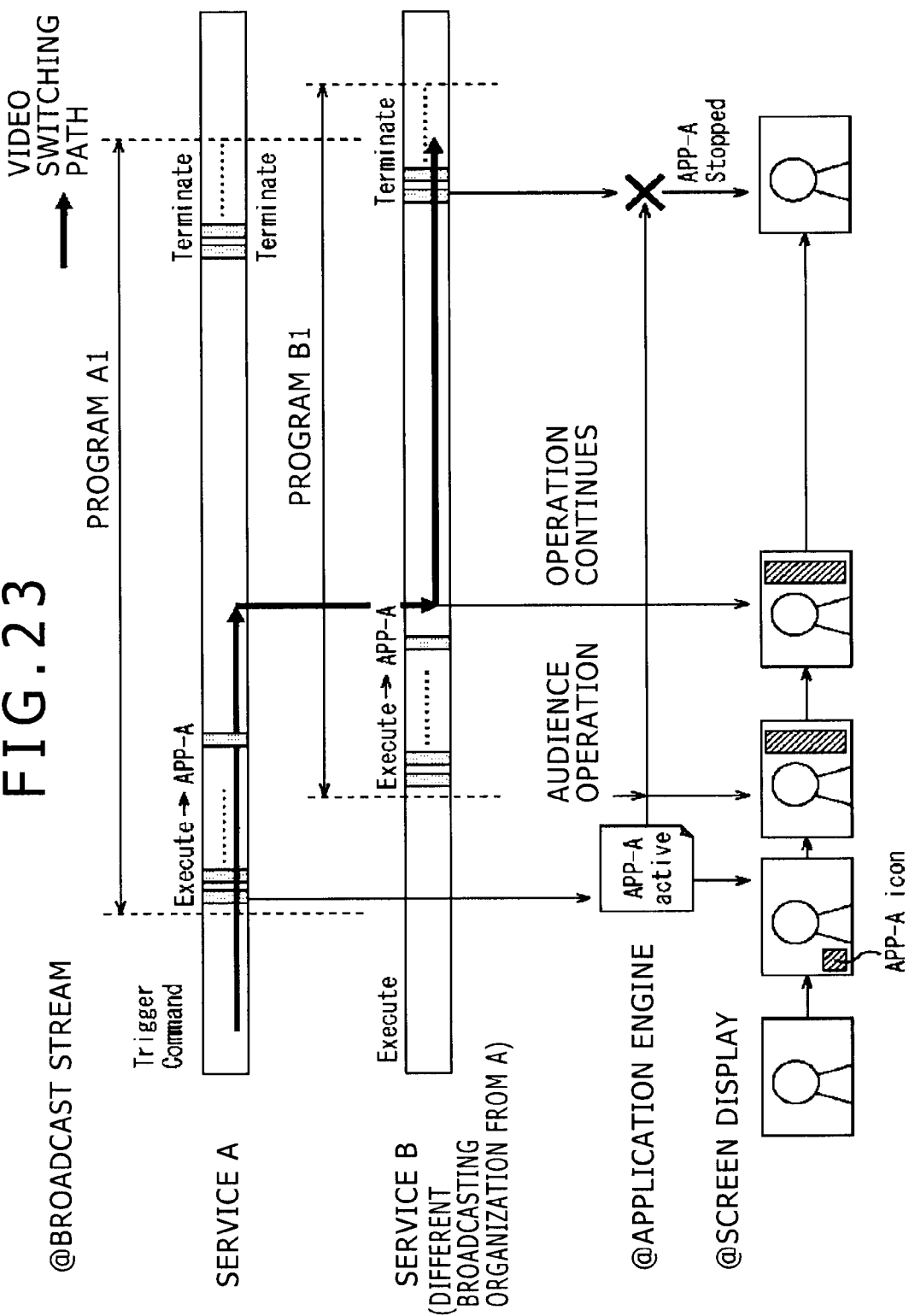
FIG. 23 is a schematic diagram illustrating an operation scenario when App_life_scope is un-bound.

Referring to FIG. 23, there is shown an operation scenario to be executed when App_life_scope of an active data broadcasting application is un-bound.

When the trigger information of an execute command for the data broadcasting application App-A is received with program A1 being broadcast in service A received and displayed by the reception apparatus 60, the data broadcasting application App-A is launched accordingly. Then, if the station selection is changed to program B1 being broadcast in service B by a different broadcasting organization than that of service A, the video switching interrupt processing is executed. However, because App_life_scope is un-bound, the active data broadcasting application App-A is continuously executed. Namely, the active data broadcasting application App-A is continuously executed upon reception of the trigger information of the execute command corresponding to this data broadcasting application.

As described above, according to the video switching interrupt processing, the active state of each data broadcasting application can be continued or terminated according to the types of video switching operations. Consequently, even if the user executes a video switching operation, for example, if this video switching operation is taken place within the same service or the same broadcasting organization, a control function can be provided to continuously execute each data broadcasting application. In addition, the above-mentioned novel configuration provides another control function for continuously executing data broadcasting applications common to all services (or channels).

It should be noted that, in the present embodiment, App_life_scope for each data broadcasting application is included in the trigger information that is an execute command; however, it is also practicable to include App_life_scope in the program itself of each data broadcasting application.

The above-mentioned sequence of processing operations may be executed by software as well as hardware. When the above-mentioned sequence of processing operations is executed by software, the programs constituting the software are installed in a computer which is built in dedicated hardware equipment or installed, from a program recording media, into a general-purpose personal computer for example in which various programs may be installed for the execution of various functions.

Referring to FIG. 24, there is shown a block diagram of an exemplary hardware configuration of a computer by which the above-mentioned sequence of processing operations are executed.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, a microphone, and so on, an output block 107 made up of a display monitor, a loudspeaker, and so on, a storage block 108 based on a hard disk unit or a nonvolatile memory, a communication block 109 based on a network interface and so on, and a drive 110 configured to drive a removable media 111 such as a magnetic disk, an optical disk, a magneto-optical disk, or a semiconductor memory.

In the computer configured as described above, the CPU 101 loads a program stored in the storage block 108 into the RAM 103 via the input/output interface 105 and the bus 104 to run the loaded program, thereby executing the above-mentioned sequence of processing operations.

It should be noted that the program to be run by the computer may execute the processing operations in a time dependent manner in the sequence described herein, in parallel, or as on an on-demand basis.

It should also be noted that each program may be run by one unit of computer or by two or more units of computers in a distributed manner. Further, each program may be transferred to a remote computer and run thereon.

It should also be noted that term "system" as used herein denotes an entire apparatus configured by a plurality of component units.

While preferred embodiments of the present invention have been described using specific terms, such description is for illustrative purpose, and it is to be understood that changes and variations may be made without departing from the spirit or scope of the following claims.

What is claimed is:

1. A reception apparatus, comprising:
a receiver configured to receive first AV (Audio/Video) content; and
processing circuitry configured to
decode the first AV content for display,
control, based on control information associated with the first AV content, execution of a specific application that is executed with the display of the decoded first AV content, and
determine, based on execution continuation information for the specific application, whether the execution of the specific application based on the control information is permitted to continue when the first AV content decoded for display switches to second AV content while the specific application is being executed, wherein
the execution continuation information is application specific and indicates whether the execution of the specific application is restricted to one of a plurality of different restriction types;
the execution continuation information indicates different values for the plurality of different restriction types when the execution of the specific application is restricted;
the execution continuation information is included in the control information or the specific application; and
the execution continuation information indicates
a first value in a case that the specific application is restricted to an ES-bound condition in which the execution of the specific application is permitted to continue when the first AV content decoded for display is switched to the second AV content within a same ES (Elementary Stream),
a second value in a case that the specific application is restricted to a service-bound condition in which the execution of the specific application is permitted to continue when the first AV content decoded for display is switched to the second AV content within a same service,
a third value in a case that the specific application is restricted to a provider-bound condition in which the execution of the specific application is permitted to continue when the first AV content decoded for display is switched to the second AV content of a same broadcaster, and
a fourth value in a case that the execution of the specific application is permitted to continue when the first AV content decoded for display is switched without restriction.

2. The reception apparatus according to claim 1, wherein the receiver is configured to receive a digital television broadcast signal that includes the first AV content and the control information.

3. The reception apparatus according to claim 1, wherein, when the display of the first AV content switches to the decoded second AV content while the specific application is being executed, the processing circuitry continues or terminates execution of the specific application based on the execution continuation information associated with the specific application.

4. The reception apparatus according to claim 1, wherein the execution continuation information is included in the control information.

5. The reception apparatus according to claim 1, wherein the execution continuation information is included in the specific application.

6. The reception apparatus according to claim 1, wherein the processing circuitry is further configured to control acquisition and launching of the specific application, event firing in the specific application during execution, suspension of the specific application during execution, and termination of the specific application during execution in accordance with a command indicated by the control information.

7. The reception apparatus according to claim 1, wherein the specific application outputs content for display that is related to the first AV content.

8. The reception apparatus according to claim 1, wherein one of the plurality of different restriction types is that the execution of the specific application is permitted to continue when the first AV content decoded for display is switched to the second AV content included in any of a plurality of services include in a received digital television broadcast signal.

9. The reception apparatus according to claim 1, wherein the control information is received by the receiver, and
the control information indicates an action to be performed for the specific application and includes the execution continuation information.

10. The reception apparatus according to claim 9, wherein the action is to execute the specific application.

11. A method of a reception apparatus for executing a specific application, the method comprising:
receiving, by a receiver, first AV (Audio/Video) content;
decoding the first AV content for display;
controlling, based on control information associated with the first AV content, execution of the specific application that is executed with the display of the decoded first AV content; and
determining, by circuitry of the reception apparatus based on execution continuation information for the specific application, whether the execution of the specific application based on the control information is permitted to continue when the first AV content decoded for display switches to second AV content while the specific application is being executed, wherein
the execution continuation information is application specific and indicates whether the execution of the specific application is restricted to one of a plurality of different restriction types;
the execution continuation information indicates different values for the plurality of different restriction types when the execution of the specific application is restricted;
the execution continuation information is included in the control information or the specific application; and
the execution continuation information indicates
a first value in a case that the specific application is restricted to a ES-bound condition in which the execution of the specific application is permitted to continue when the first AV content decoded for display is switched to the second AV content within a same ES (Elementary Stream), a second value in a case that the specific application is restricted to a service-bound condition in which the execution of the specific application is permitted to continue when the first AV content decoded for display is switched to the second AV content within a same service, a third value in a case that the specific application is restricted to a provider-bound condition in which the execution of the specific application is permitted to continue when the first AV content decoded for display is switched to the second AV content of a same broadcaster, and a fourth value in a case that the specific application is permitted to continue when the first AV content decoded for display is switched without restriction.

12. The method according to claim 11, wherein the step of receiving comprises:

receiving a digital television broadcast signal that includes the first AV content and the control information.

13. The method according to claim 11, further comprising:

continuing or terminating execution of the specific application based on the execution continuation information associated with the specific application when the first AV content decoded for display switches to the second AV content while the specific application is being executed.

14. The method according to claim 11, wherein the execution continuation information is included in the control information.

15. The method according to claim 11, wherein the execution continuation information is included in the specific application.

16. The method according to claim 11, wherein the step of controlling comprises:

controlling acquisition and launching of the specific application, event firing in the specific application during execution, suspension of the specific application during execution, or termination of the specific application during execution in accordance with a command indicated by the control information.

17. A non-transitory computer-readable medium storing instructions which when executed by a computer causes the computer to perform a method of a reception apparatus for executing a specific application, the method comprising:

receiving first AV (Audio/Video) content;

decoding the first AV content for display;

controlling, based on control information associated with the first AV content, execution of the specific application that is executed with the display of the decoded first AV content; and determining, based on execution continuation information for the specific application, whether the execution of the specific application based on the control information is permitted to continue when the first AV content decoded for display switches to second AV content while the specific application is being executed, wherein the execution continuation information is application specific and indicates whether the execution of the specific application is restricted to one of a plurality of different restriction types;

the execution continuation information indicates different values for the plurality of different restriction types when the execution of the specific application is restricted;

the execution continuation information is included in the control information or the specific application; and the execution continuation information indicates a first value in a case that the specific application is restricted to a ES-bound condition in which the execution of the specific application is permitted to continue when the first AV content decoded for display is switched to the second AV content within a same ES (Elementary Stream), a second value in a case that the specific application is restricted to a service-bound condition in which the execution of the specific application is permitted to continue when the first AV content decoded for display is switched to the second AV content within a same service, a third value in a case that the specific application is restricted to a provider-bound condition in which the execution of the specific application is permitted to continue when the first AV content decoded for display is switched to the second AV content of a same broadcaster, and a fourth value in a case that the specific application is permitted to continue when the first AV content decoded for display is switched without restriction.

* * * * *